(12) United States Patent
Pyeon

(10) Patent No.: US 8,037,235 B2
(45) Date of Patent: Oct. 11, 2011

(54) DEVICE AND METHOD FOR TRANSFERRING DATA TO A NON-VOLATILE MEMORY DEVICE

(75) Inventor: Hong Beom Pyeon, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 477 days.

(21) Appl. No.: 12/337,841

(22) Filed: Dec. 18, 2008

(65) Prior Publication Data

US 2010/0161877 A1    Jun. 24, 2010

(51) Int. Cl.
*G06F 12/00*    (2006.01)

(52) U.S. Cl. ........................................... 711/103
(58) Field of Classification Search ................ None
See application file for complete search history.

(56) References Cited

U.S. PATENT DOCUMENTS

| | | | |
|---|---|---|---|
| 4,617,566 A | 10/1986 | Diamond |
| 4,796,231 A | 1/1989 | Pinkham |
| 4,802,129 A | 1/1989 | Hoekstra et al. |
| 5,132,635 A | 7/1992 | Kennedy |
| 5,204,669 A | 4/1993 | Dorfe et al. |
| 5,243,703 A | 9/1993 | Farmwald et al. |
| 5,319,598 A | 6/1994 | Aralis et al. |
| 5,404,460 A | 4/1995 | Thomsen et al. |
| 5,430,859 A | 7/1995 | Norman et al. |
| 5,437,018 A | 7/1995 | Kobayashi et al. |
| 5,473,563 A | 12/1995 | Suh et al. |
| 5,473,566 A | 12/1995 | Rao |
| 5,473,577 A | 12/1995 | Miyake et al. |
| 5,535,357 A | 7/1996 | Moran et al. |
| 5,636,342 A | 6/1997 | Jeffries |
| 5,721,840 A | 2/1998 | Soga |
| 5,729,683 A | 3/1998 | Le et al. |
| 5,740,379 A | 4/1998 | Hartwig |
| 5,802,399 A | 9/1998 | Yumoto et al. |
| 5,802,555 A | 9/1998 | Shigeeda |
| 5,806,070 A | 9/1998 | Norman et al. |
| 5,828,899 A | 10/1998 | Richard et al. |

(Continued)

FOREIGN PATENT DOCUMENTS

WO    WO 2005/069150 A1    7/2005

(Continued)

OTHER PUBLICATIONS

U.S. Appl. No. 12/564,492; Pyeon; Semiconductor Memory with Multiple Wordline Selection; Sep. 22, 2009.*

(Continued)

*Primary Examiner* — Hiep Nguyen

(57) ABSTRACT

A semiconductor device for transferring input data to a non-volatile memory device. The semiconductor device comprises a virtual page buffer including a plurality of data elements; a mask buffer including a corresponding plurality of data elements; control logic circuitry for (i) setting each of the mask buffer data elements to a first logic state upon receipt of a trigger; (ii) causing input data to be written to selected virtual page buffer data elements; and (iii) causing those mask buffer data elements corresponding to the selected virtual page buffer data elements to be set to a different logic state; mask logic circuitry configured to generate masked output data by combining, for each of the virtual page buffer data elements, data read therefrom together with the logic state of the corresponding mask buffer data element; and an output interface configured to release the masked output data towards the non-volatile memory device.

33 Claims, 13 Drawing Sheets

U.S. PATENT DOCUMENTS

| | | | |
|---|---|---|---|
| 5,859,809 | A | 1/1999 | Kim |
| 5,953,538 | A | 9/1999 | Duncan et al. |
| 5,959,930 | A | 9/1999 | Sakurai |
| 6,002,638 | A | 12/1999 | John |
| 6,091,660 | A | 7/2000 | Sasaki et al. |
| 6,101,579 | A | 8/2000 | Randolph et al. |
| 6,144,576 | A | 11/2000 | Leddige et al. |
| 6,148,363 | A | 11/2000 | Lofgren et al. |
| 6,208,556 | B1 | 3/2001 | Akaogi et al. |
| 6,230,233 | B1 | 5/2001 | Lofgren et al. |
| 6,295,618 | B1 | 9/2001 | Keeth |
| 6,304,921 | B1 | 10/2001 | Rooke |
| 6,317,350 | B1 | 11/2001 | Pereira et al. |
| 6,317,352 | B1 | 11/2001 | Halbert et al. |
| 6,317,812 | B1 | 11/2001 | Lofgren et al. |
| 6,438,064 | B2 | 8/2002 | Ooishi |
| 6,442,098 | B1 | 8/2002 | Kengeri |
| 6,453,365 | B1 | 9/2002 | Habot |
| 6,456,528 | B1 | 9/2002 | Chen |
| 6,535,218 | B1 | 3/2003 | Schlapp |
| 6,559,851 | B1 | 5/2003 | Schlapp |
| 6,594,183 | B1 | 7/2003 | Lofgren et al. |
| 6,601,199 | B1 | 7/2003 | Fukuda et al. |
| 6,658,509 | B1 | 12/2003 | Bonella et al. |
| 6,680,904 | B1 | 1/2004 | Kaplan et al. |
| 6,683,817 | B2 | 1/2004 | Wei et al. |
| 6,715,044 | B2 | 3/2004 | Lofgren et al. |
| 6,717,847 | B2 | 4/2004 | Chen |
| 6,754,807 | B1 | 6/2004 | Parthasarathy et al. |
| 6,763,426 | B1 | 7/2004 | James et al. |
| 6,807,106 | B2 | 10/2004 | Gonzales et al. |
| 6,816,933 | B1 | 11/2004 | Andreas |
| 6,850,443 | B2 | 2/2005 | Lofgren et al. |
| 6,853,557 | B1 | 2/2005 | Haba et al. |
| 6,853,573 | B2 | 2/2005 | Kim et al. |
| 6,928,501 | B2 | 8/2005 | Andreas et al. |
| 6,944,093 | B2 * | 9/2005 | Sumitani ........................ 365/235 |
| 6,944,697 | B2 | 9/2005 | Andreas |
| 6,950,325 | B1 | 9/2005 | Chen |
| 6,978,402 | B2 | 12/2005 | Hirabayashi |
| 6,996,644 | B2 | 2/2006 | Schoch et al. |
| 7,031,221 | B2 | 4/2006 | Mooney et al. |
| 7,181,572 | B2 | 2/2007 | Walmsley |
| 7,336,516 | B2 | 2/2008 | Tran et al. |
| 7,370,170 | B2 | 5/2008 | Shaikh et al. |
| 7,505,295 | B1 | 3/2009 | Nataraj et al. |
| 7,533,222 | B2 | 5/2009 | Leung |
| 7,599,975 | B1 | 10/2009 | Donovan et al. |
| 7,742,334 | B2 * | 6/2010 | Fujisawa et al. ......... 365/185.03 |
| 2002/0161941 | A1 | 10/2002 | Chue et al. |
| 2008/0209110 | A1 | 8/2008 | Pyeon et al. |
| 2008/0279003 | A1 | 11/2008 | Kim et al. |

FOREIGN PATENT DOCUMENTS

WO    WO 2008/022434 A1    2/2008

OTHER PUBLICATIONS

U.S. Appl. No. 12/640,388; Pyeon: Semiconductor Device with Main Memory Unit and Auxiliary Memory Unit Requiring Preset Operation; Dec. 17, 2009.*

Shinji Saito et al., "A Programmable 8Ons 1Mb CMOS EPROM", IEEE ISSCC 85, Digest of Technical Papers, Feb. 14, 1985, pp. 176-177, 340.

R. Kirisawa et al., "A NAND Structured Cell with a new Programming Technology for Highly Reliable 5V-Only Flash EEPROM", 1990 Symposium on VLSI Tech., Apr. 6, 1990, pp. 129-130.

S. Aritome et al., "A Reliable Bi-Polarity Write/Erase Technology in Flash EEPROMs", Int'l. Electron Devices Meeting, 1990, Technical Digest, Dec. 9-12, 1990, pp. 111-114.

R. Shirota et al., "A 2.3µm2 Memory Cell Structure for 16Mb NAND EEPROMs", International Electron Devices Meeting 1990, Technical Digest, (1990), pp. 103-106.

Samsung Electronics Co. Ltd, "256M x 8 Bit / 128M x 16 Bit / 512M x 8 Bit NAND Flash Memory", K9K4G08U1M, K9F2G08U0M, K9F2G16U0M, May 6, 2005, pp. 1-41.

Samsung Electronics Co. Ltd., "1G x 8 Bit/ 2G x 8 Bit NAND Flash Memory", K9F8G08UXM, May 31, 2007, pp. 1-54.

Samsung Electronics Co. Ltd., "512M x 8 Bit / 1G x 8 Bit NAND Flash Memory", K9XXG08UXA, May 7, 2006, pp. 1-43.

Samsung Electronics Co. Ltd, "1G x 8 Bit / 2 G x 8 Bit / 4G x 8 Bit NAND Flash Memory", K9XXG08UXA, Jul. 18, 2006, pp. 1-50.

Eran Gal et al., "Algorithms and Data Structures for Flash Memories", ACM Computing Surveys (CSUR), vol. 37, No. 2, Jun. 2005, Tel Aviv University, pp. 138-163.

Samsung Electronics Co. Ltd, "2G x 8 Bit NAND Flash Memory", K9GAG08U0M, Apr. 12, 2006, pp. 1-48.

Toshiba, "16 GBIT (2G x 8 Bit) CMOS NAND E2PROM (Multi-Level-Cell)", TC58NVG4D1DTG00, Nov. 9, 2006, pp. 1-64.

Atmel Corp., "High Speed Small Sectored SPI Flash Memory 4M (524,288 x 8)", AT25FS040 Advance Information, pp. 1-22, 2006.

Stephen L. Diamond, "SyncLink: High-speed DRAM for the future", Micro Standards, IEEE Micro, Dec. 1996, pp. 74-75.

Atmel, "8-megabit 2.5-volt Only or 2.7-volt Only DataFlash® ", AT45DB081B, Technical Specification, Atmel, Rev. 2225H-DFLSH (2004), pp. 1-32.

Intel Corporation, "Intel® Advanced+ Boot Block Flash Memory (C3)", May 2005, pp. 1-72.

Joseph Kennedy et al, "A 2Gb/s Point-to-Point Heterogeneous Voltage Capable DRAM Interface for Capacity-Scalable . . . ", ISSCC 2004/Session 11/DRAM/11.8, Feb. 15-19, 2004, 10 pages.

Craig L. King et al., "Communicating with Daisy Chained MCP42XXX Digital Potentiometers", Microchip AN747, 2001, pp. 1-8.

M-Systems Flash Disk Pioneers Ltd., "DiskOnChip H1 4Gb (512MByte) and 8Gb (1GByte) High Capacity Flash Disk with NAND and x2 Technology", Data Sheet, Rev. 0.5, pp. 1-66.

Dae-Seok Byeon et al., "An 8Gb Multi-Level NAND Flash Memory with 63nm STI CMOS Process Technology", ISSCC 2005/Session 2/Non-Volatile Memory/2.2, pp. 46-47.

Taehee Cho et al., "A Dual Mode NAND Flash Memory: 1-Gb Multilevel and High-Performance 512-Mb . . . ", IEEE Jrnl of Solid-State Circuits, vol. 36, No. 11, Nov. 2001, pp. 1700-1706.

Young Choi, "16-Gbit MLC NAND flash weighs in", EETimes.com, Jul. 7, 2007, http://www.eetimes.com/showArticle.jhtml?articleD=201200825, pp. 1-3.

Takahiko Hara et al., "A 146mm2 8GB NAND Flash Memory with 70nm CMOS Technology", ISSCC 2005/Session 2/Non-Volatile Memory/2.1, Feb. 2005, pp. 44, 45, 584.

Kenichi Imamiya et al., "A 125-mm2 1-Gb NAND Flash Memory with 10-MByte/s Program Speed", IEEE Journal of Solid-State Circuits, vol. 37, No. 11, Nov. 2002, pp. 1493-1501.

Tae-Sung Jung et al., "A 117-mm2 3.3-V Only 128-Mb Multilevel NAND Flash Memory for Mass Storage Appls.," IEEE J. of Solid-State Circuits, vol. 31, No. 11, Nov. 1996, pp. 1575-1583.

Jin-Ki Kim et al. "A-120-mm2 64 Mb NAND Flash Memory Archieving 180 ns/Byte Effective Program Speed," IEEE J. of Solid-State Circuits, vol. 32, No. 5, May 1997, pp. 670-680.

June Lee et al., "A 90-nm CMOS 1.8-V 2-Gb NAND Flash Memory for Mass Storage Appls.", IEEE Journal of Solid-State Circuits, vol. 38, No. 11, Nov. 2003. pp. 1934-1942.

June Lee et al., "High-Performance 1-Gb NAND Flash Memory with 0.12-µm Technology", IEEE Journal of Solid-State Circuits, vol. 37, No. 11, Nov. 2002, pp. 1502-1509.

Masaki Momodomi et al., "A 4-Mb NAND EEPROM with Tight Programmed Vt Distribution", IEEE Journal of Solid-State Circuits, vol. 26, No. 4, Apr. 1991, pp. 492-496.

Nobuaki Ohtsuka et al., "A 4-Mbit CMOS EPROM", IEEE Journal of Solid-State Circuits, vol. SC-22, No. 5, Oct. 1987, pp. 669-675.

Kang-Deog Suh et al., "A 3.3 V 32 Mb NAND Flash Memory with Incremental Step Pulse Programming Scheme", IEEE J. of Solid-State Circuits, vol. 30, No. 11, Nov. 1995, pp. 1149-1156.

Ken Takeuchi et al, "A 56nm CMOS 99mm2 8Gb Multi-level NAND Flash Memory with 10MB/s Program Troughput", ISSCC 2006/Session 7/Non-Volatile Memory/7.7, Feb. 6-9, 2006, pp. 144, 145, 645.

Ken Takeuchi et al, "A Multipage Cell Architecture for High-Speed Programming Multilevel NAND Flash . . . ", IEEE J. of Solid-State Circuits, vol. 33, No. 8, Aug. 1998, pp. 1228-1238.

T. Tanaka et al., "A Quick Intelligent Page-Programming Architecture and a Shielded Bitline Sensing . . . " IEEE J. of Solid-State Circuits, vol. 29, No. 11, Nov. 1994, pp. 1366-1373.

Toru Tanzawa et al., "A Dynamic Analysis of the Dickson Charge Pump Circuit", IEEE J. of Solid-State Circuits, vol. 32, No. 8, Aug. 1997, pp. 1231-1240.

Toru Tanzawa et al., "Circuit Techniques for a 1.8-V-Only NAND Flash Memory", IEEE Journal of Solid-State Circuits, vol. 37, No. 1, Jan. 2002, pp. 84-89.

Naoto Tomita et al., "A 62-ns 16Mb CMOS EPROM with Voltage Stress Relaxation Technique", IEEE Journal of Solid-State Circuits, vol. 26, No. 11, Nov. 1991, pp. 1593-1599.

Toshiba, "2GBIT (256M × 8 Bits) CMOS NAND E2PROM", TH58NVG1S3AFT05, May 19, 2003, pp. 1-32.

Yoichi Oshima et al., "High-Speed Memory Architectures for Multimedia Applictions", Circuits & Devices, IEEE 8755-3996/97, pp. 8-13, Jan. 1997.

Samsung Electronics, "K9XXG08UXM Preliminary Flash Memory", Technical Specification, Samsung Electronics, May 3, 2005, 43 pages.

Samsung Electronics, "OneNAND™ Specification", Ver. 1.2, Dec. 23, 2005, 125 pages.

Stmicroelectronics Group, "2Mbit, Low Voltage, Serial Flash Memory With 40 MHz SPI Bus Interface", Technical Specification, Aug. (2005), 40 pages.

Silicon Storage Technology Inc., "16 Mbit SPI Serial Flash", SST25VF016B, Preliminary Specifications, © 2005, 28 pages.

Spansion LLC, "S70GL01GN00 MirrorBit Flash, 1024 Megabit, 3.0 Volt-only Page Mode Flash Memory Featuring 110 nm MirrorBit Process Technology, Data Sheet", Jun. 1, 1995, 83 pgs.

Tal, A., "Guidelines for Integrating DiskOnChip in a Host System", AP-DOC-1004, Rev. 1.0, M-Systems Flash Pioneers Ltd., pp. 1-15, 2004.

Toshiba America Electronics Components Inc., "NAND Flash Applications Design Guide", Revision 1.0, Apr. 2003, 29 pages.

Takahiko Hara et al., "A 146-mm2 8-Gb Multi-Level NAND Flash Memory With 70-nm CMOS Technology", IEEE J. of Solid-State Circuits, vol. 41, No. 1, Jan. 2006, pp. 161-169.

Seungjae Lee et al., "A 3.3V 4Gb Four-Level NAND Flash Memory with 90nm CMOS Technology", ISSCC 2004/Session 2/Non-Volatile Memory/2.7, Feb. 15-19, 2004, 10 pages.

Spansion, "64 Megabit CMOS 3.0 Volt Flash Memory with 50MHz SPI (Serial Peripheral Interface) Bus", Data Sheet (Preliminary), Sep. 6, 2006, 32 pages.

Written Opinion of the International Searching Authority mailed on Apr. 19, 2010 in connection with International Patent Application PCT/CA2009/001860, 4 pages.

International Search Report mailed on Apr. 19, 2010 in connection with International Patent Application PCT/CA2009/001860, 5 pages.

Office Action issued by the United States Patent and Trademark Office on Mar. 24, 2011 in connection with U.S. Appl. No. 12/564,492, 10 pages.

* cited by examiner

FIG. 6

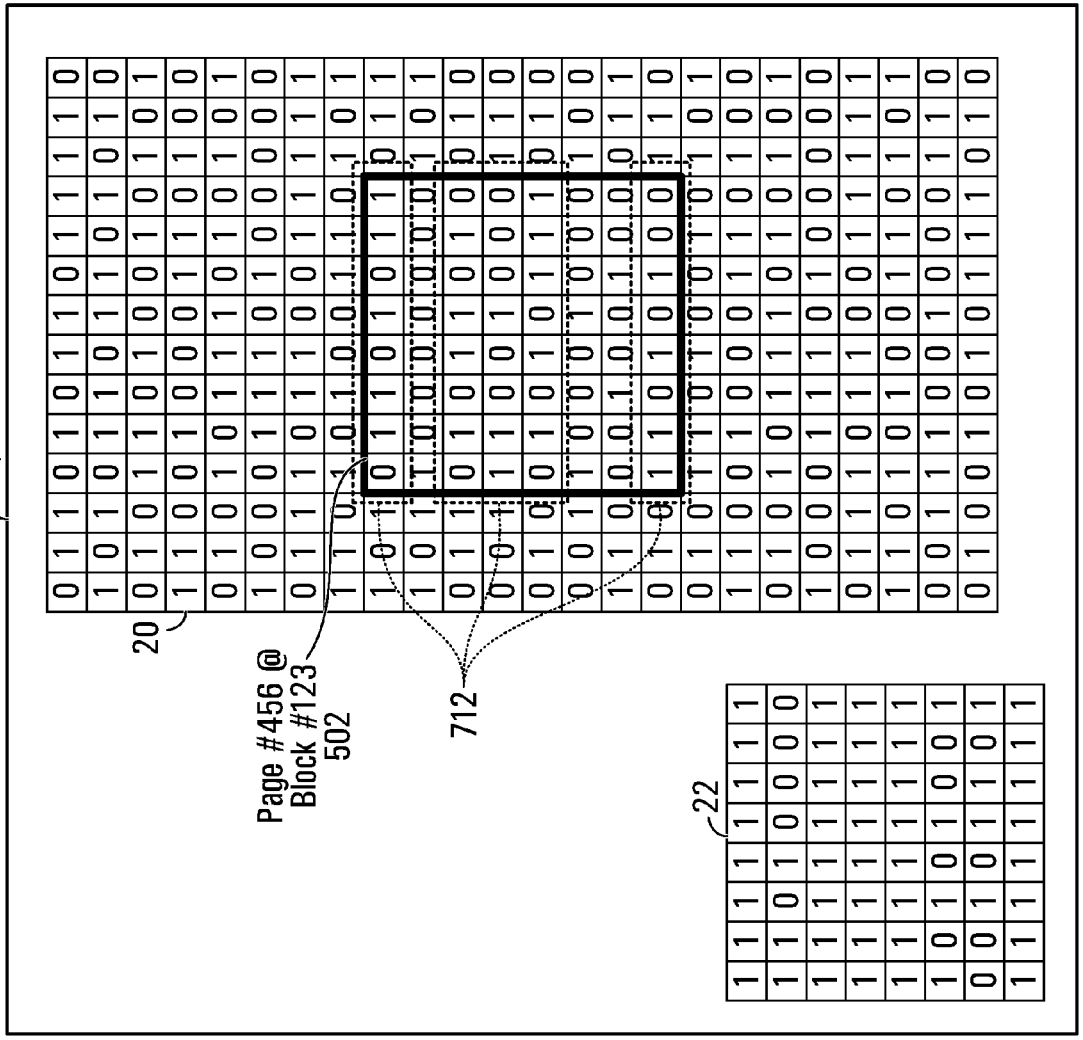
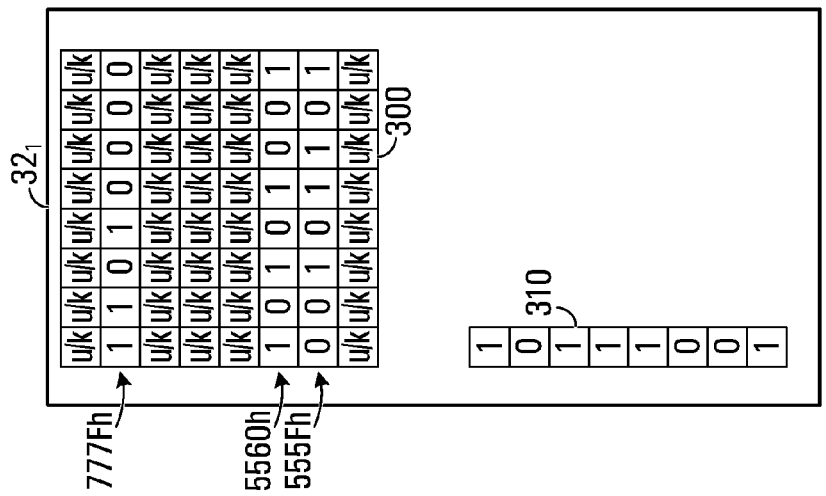
FIG. 9

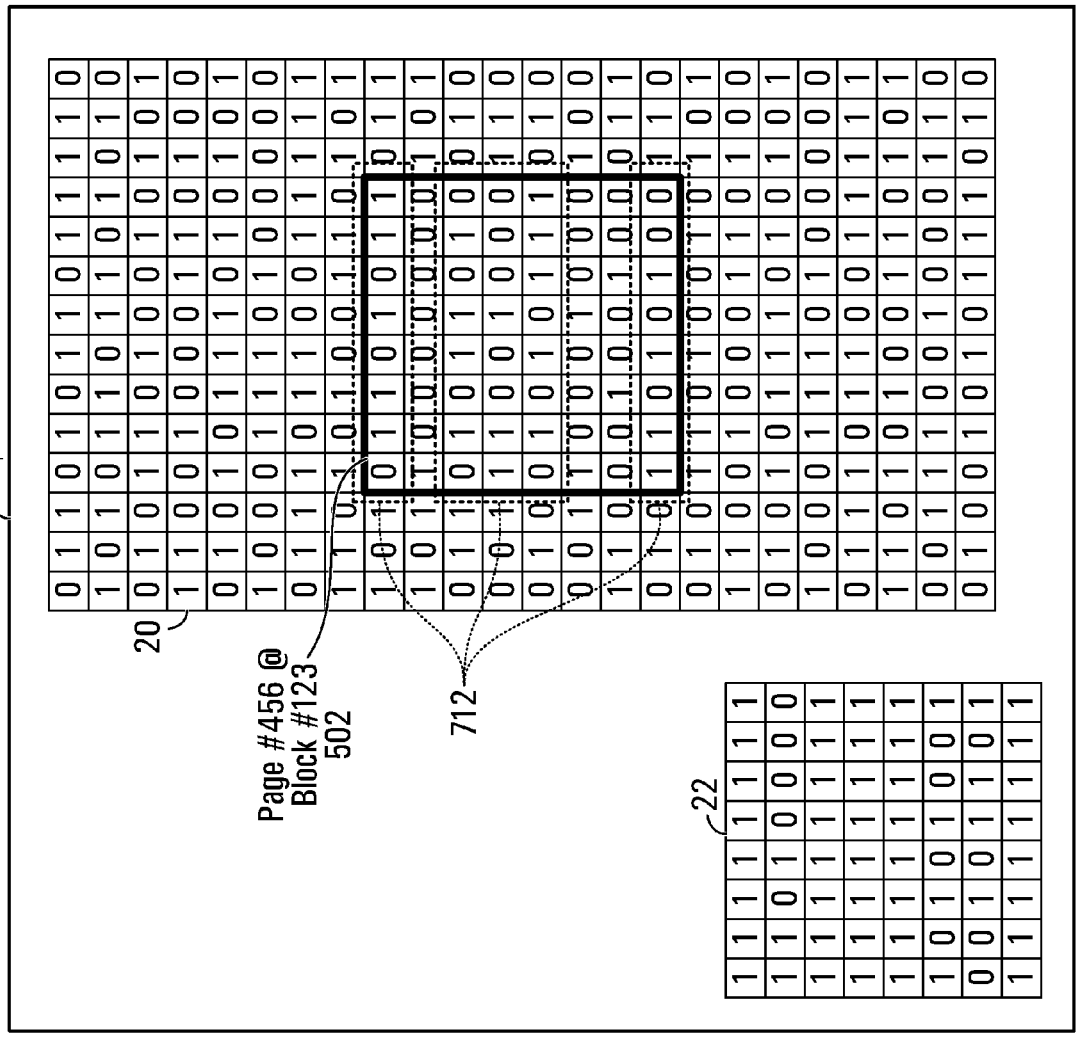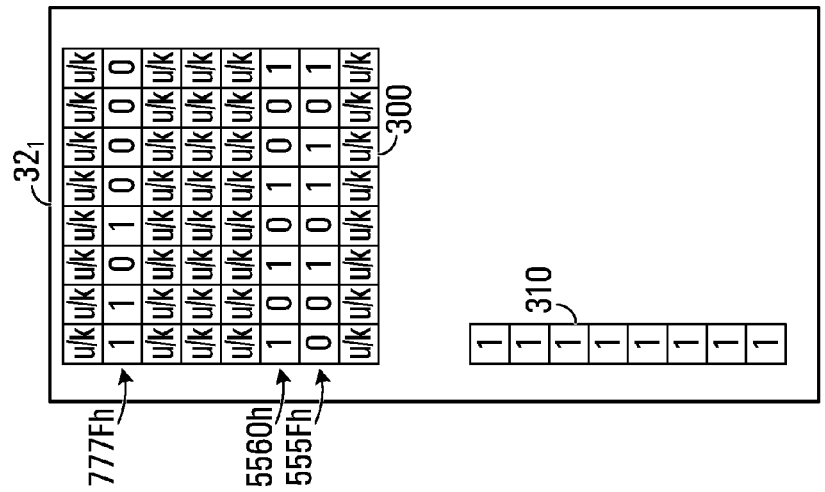
FIG. 10

DEVICE AND METHOD FOR TRANSFERRING DATA TO A NON-VOLATILE MEMORY DEVICE

BACKGROUND

A flash memory device consists of memory cells and a page buffer in a core memory block, along with peripheral circuitry for exchanging data with a controller. Since the introduction of flash memory devices on the consumer market, they have gained widespread popularity and acceptance, while their original asynchronous interface to the controller has remained unchanged for the most part.

Recently, certain improvements in flash memory technology have been developed, but require an interface design that is incompatible with conventional flash memory devices. To allow conventional flash memory devices to nevertheless benefit from the improved technology, use of a bridge chip has been contemplated. A bridge chip would provide a bidirectional interface between an improved controller and conventional flash memory devices.

It will be appreciated that the design of a bridge chip poses various challenges, at least some of these being associated with the need to temporarily store data to be transferred to a conventional flash memory device.

SUMMARY OF THE INVENTION

According to a first aspect, there is provided a semiconductor device for transferring input data to a non-volatile memory device. The semiconductor device comprises a virtual page buffer including a plurality of data elements. The semiconductor device also comprises a mask buffer including a plurality of data elements, each of the data elements of the mask buffer corresponding to a respective one of the data elements of the virtual page buffer. The semiconductor device also comprises control logic circuitry for (i) setting each of the data elements of the mask buffer to a first logic state upon receipt of a trigger; (ii) causing input data to be written to selected ones of the data elements of the virtual page buffer; and (iii) causing those data elements of the mask buffer corresponding to the selected ones of the data elements of the virtual page buffer to be set to a second logic state different from the first logic state. The semiconductor device also comprises mask logic circuitry configured to provide masked output data by combining, for each of the data elements of the virtual page buffer, data read therefrom together with the logic state of the corresponding one of the data elements of the mask buffer. The semiconductor device also comprises an output interface configured to release the masked output data towards the non-volatile memory device.

According to a second aspect, there is provided a memory system, which comprises a semiconductor device defined in at least one non-volatile memory device. The semiconductor device comprises a virtual page buffer including a plurality of data elements. The semiconductor device also comprises a mask buffer including a plurality of data elements, each of the data elements of the mask buffer corresponding to a respective one of the data elements of the virtual page buffer. The semiconductor device also comprises control logic circuitry for (i) setting each of the data elements of the mask buffer to a first logic state upon receipt of a trigger; (ii) causing input data to be written to selected ones of the data elements of the virtual page buffer; and (iii) causing those data elements of the mask buffer corresponding to the selected ones of the data elements of the virtual page buffer to be set to a second logic state different from the first logic state. The semiconductor device also comprises mask logic circuitry configured to provide masked output data by combining, for each of the data elements of the virtual page buffer, data read therefrom together with the logic state of the corresponding one of the data elements of the mask buffer. The semiconductor device also comprises an output interface configured to release the masked output data towards the at least one non-volatile memory device.

According to a third aspect, there is provided a method for transferring input data to a non-volatile memory device. The method comprises maintaining a virtual page buffer including a plurality of data elements; maintaining a mask buffer including a plurality of data elements, each of the data elements of the mask buffer corresponding to a respective one of the data elements of the virtual page buffer; setting each of the data elements of the mask buffer to a first logic state upon receipt of a trigger; writing data to selected ones of the data elements of the virtual page buffer and setting those data elements of the mask buffer corresponding to the selected ones of the data elements of the virtual page buffer to a second logic state different from the first logic state; providing masked output data by combining, for each of the data elements of the virtual page buffer, data read therefrom together with the logic state of the corresponding one of the data elements of the mask buffer; and releasing the masked output data towards the non-volatile memory device.

According to a fourth aspect, there is provided a computer-readable storage medium storing instructions which, when processed, are used to provide a semiconductor device configured to maintain a virtual page buffer including a plurality of data elements; maintain a mask buffer including a plurality of data elements, each of the data elements of the mask buffer corresponding to a respective one of the data elements of the virtual page buffer; set each of the data elements of the mask buffer to a first logic state upon receipt of a trigger; write data to selected ones of the data elements of the virtual page buffer and setting those data elements of the mask buffer corresponding to the selected ones of the data elements of the virtual page buffer to a second logic state different from the first logic state; provide masked output data by combining, for each of the data elements of the virtual page buffer, data read therefrom together with the logic state of the corresponding one of the data elements of the mask buffer; and release the masked output data towards the non-volatile memory device.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 5-10 are block diagrams illustrating the partial contents of various memory structures throughout various processing stages of an example command to write data to a specific one of the non-volatile memory devices, such command having been issued by the memory controller.

It is to be expressly understood that the description and drawings are only for the purpose of illustration of certain embodiments of the invention and are an aid for understanding. They are not intended to be a definition of the limits of the invention.

DETAILED DESCRIPTION

Figure 1A:
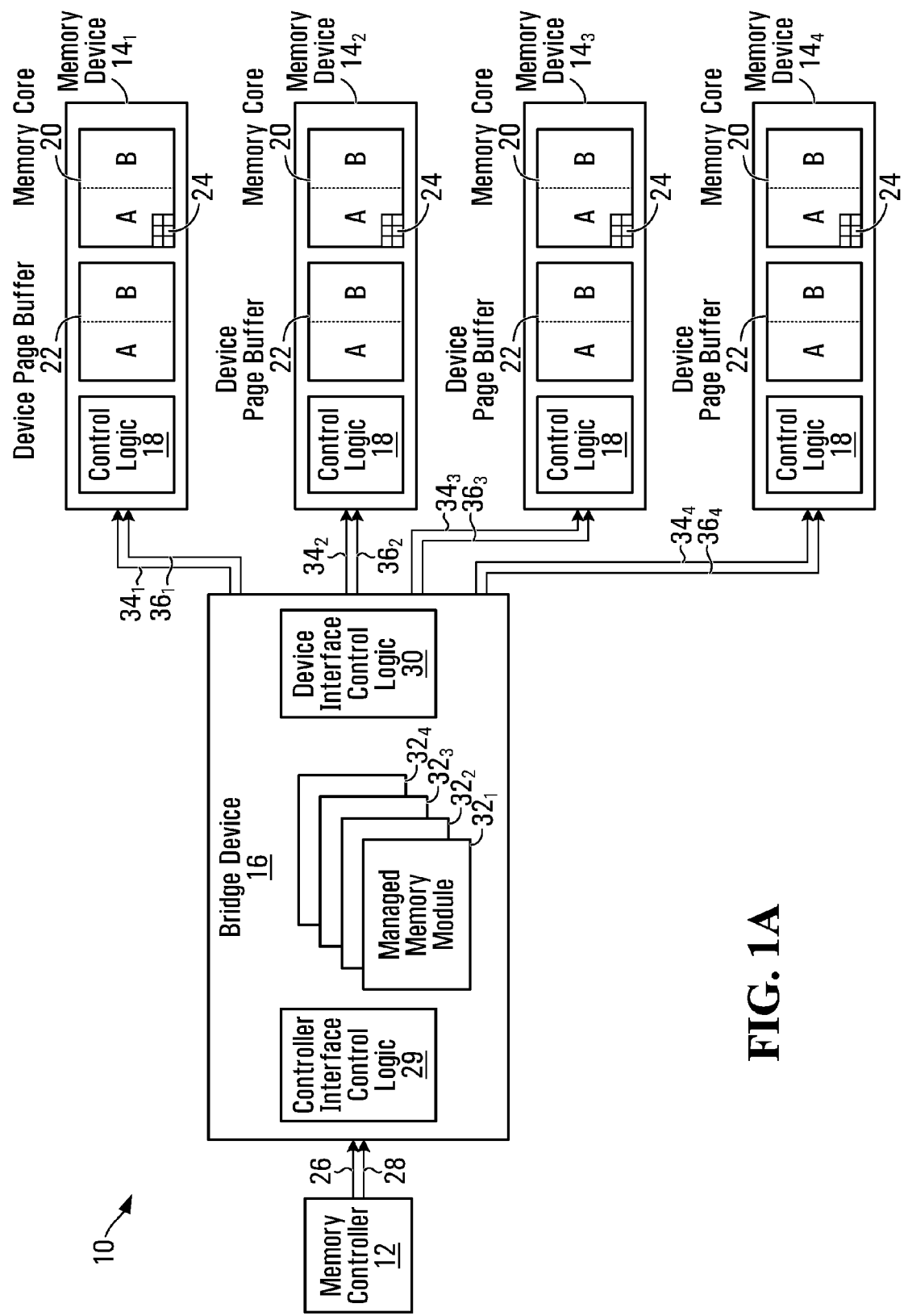
FIG. 1A is a block diagram of a memory system in accordance with a possible embodiment, including a bridge device disposed between a memory controller and a plurality of non-volatile memory devices.

With reference to FIG. 1A, there is shown a memory system 10 in accordance with a non-limiting embodiment of the present invention. The memory system 10 comprises a memory controller 12, a plurality of non-volatile memory devices $14_1$-$14_4$ and a semiconductor device. In the particular example, the semiconductor device is a bridge device 16 disposed between the memory controller 12 and the non-volatile memory devices $14_1$-$14_4$. It should be appreciated that although there are four (4) non-volatile memory devices $14_1$-$14_4$ shown in FIG. 1A, this is for illustrative purposes only, and the memory system 10 is not limited to a particular number of non-volatile memory devices. In fact, even just a single non-volatile memory device can be present in some embodiments.

Non-Volatile Memory Devices $14_1$-$14_4$

In some cases, the non-volatile memory devices $14_1$-$14_4$ can be conventionally available NAND Flash devices as purveyed by numerous suppliers in the marketplace today. For example, the non-volatile memory devices $14_1$-$14_4$ can be NAND flash, NOR flash, NROM, etc., to name a few non-limiting possibilities. In other cases, some or all of the non-volatile memory devices $14_1$-$14_4$ may be non-standard devices that are not made commercially available. It should also be appreciated that not all of the non-volatile memory devices $14_1$-$14_4$ need to be of the same type or made by the same manufacturer.

Each of the non-volatile memory devices $14_1$-$14_4$ includes a device control logic block 18, a memory core 20 and a device page buffer 22. The memory core 20 includes an arrangement of data elements 24 that can be written to and read from under control of device control logic block 18. Device control logic block 18 receives generic commands and "write data" from, as well as provides "read data" to, an external entity. As used herein, a "logic block" (as in, for example, the expression "device control logic block 18") includes circuitry and/or software to perform a desired logic function. In the figures, however, the word "block" is omitted so as not to clutter the drawings.

In a non-limiting embodiment, the data elements 24 in the memory core 20 may be organized as a plurality of "planes", each plane including a plurality of "blocks", each block including a plurality of "pages" each page including a plurality of "words". For example, in the illustrated embodiment, the memory core 20 has two ($=2^1$) planes (A and B), each plane including 32,768 ($=2^{15}$) blocks of thirty-two ($=2^5$) pages per block, with each page containing 2,048 ($=2^{11}$) eight-bit words, for a total of 4 gigabytes ($=2^{32}$ eight-bit words) of memory per non-volatile memory device. Additional words can be added for error correction and other purposes, which can bring the total to 2,112 words per plane, per page in some devices. However, it should be appreciated that other dimensionalities and configurations can be used, including a configuration whereby only a single plane is used.

The device page buffer 22 comprises an arrangement of data elements. The device page buffer 22 is used to temporarily store one page's worth of data received from the external entity before it is written to a specified page in the memory core 20, or alternatively to temporarily store one page's worth of data extracted from the memory core 20 before it is returned to the external entity in the final stages of processing a generic command to read data. Thus, in the present example, the device page buffer 22 holds 2,112 words in each of the two planes (A and B). In other embodiments, the device page buffer 22 may have a different size and may hold more than one page's worth of data.

Generic commands that may be processed by one or several of the non-volatile memory devices $14_1$-$14_4$ have a generic command structure that begins with a first command cycle. Address cycles, data cycles, and a second command cycle are all possibilities, depending on the actual command itself. A selection of possible generic commands that can be encoded by various combinations of bits conveyed by the first command cycle, as well as possible definitions of such generic commands, are provided in Table I below:

TABLE I

Definition of selected generic commands for use with non-volatile memory devices $14_1$-$14_4$

| Command | Command Cycle 1 | Number of Address Cycles | Data Cycles Required | Command Cycle 2 |
|---|---|---|---|---|
| PAGE PROGRAM | 80h | 5 | Yes | 10h |
| PAGE PROGRAM CACHE MODE | 80h | 5 | Yes | 15h |
| PAGE PROGRAM FOR INTERNAL DATA MOVE | 85h | 5 | Optional | 10h |
| RANDOM DATA INPUT | 85h | 2 | Yes | — |
| BLOCK ERASE | 60h | 3 | No | D0h |

It should be understood that various manufacturers may have different specific values for the first (and second, where applicable) command cycle related to a particular generic command. It should also be understood that various manufacturers may support different versions of the above generic commands, and may have a greater or smaller total number of generic commands. However, one aspect that is common to those non-volatile memory devices of interest here concerns the PAGE PROGRAM generic command, which in all its equivalent versions is assumed to include at least an initial command cycle (to signal onset of the PAGE PROGRAM generic command), one or more address cycles (to identify the specified page, as well as the starting point—within the specified page—of data to be written to the memory core 20), one or more data cycles (to allow inputting of the actual data to be written to the memory core 20) and a confirmatory command cycle (to trigger transfer of the contents of the device page buffer 22 into the memory core 20).

Memory Controller 12

The memory controller 12 can be a customized memory controller that is designed to perform memory operations (e.g., reading and writing) on specially adapted non-volatile memory devices, through the use of customized commands obeying a customized command structure.

By way of example, the specially adapted non-volatile memory devices can be clock-synchronous NAND flash devices, serially interconnected in a chain, as shown and described in, for example, U.S. patent application Ser. No. 12/179,835 entitled "Multiple Independent Serial Link Memory", published as United States Patent Application Publication 2008/0279003 on Nov. 13, 2008, hereby incorporated by reference herein.

By way of example, the memory controller 12 can take the form of a flash controller, as shown in FIG. 6A of International PCT Application No. PCT/CA2007/001428, published on Feb. 28, 2008 under publication number WO/2008/022434, hereby incorporated by reference herein.

The memory controller 12 issues various customized commands (intended for individual clock-synchronous NAND flash devices interconnected in a chain) by regulating the behavior of signals along a set of control lines 26 and a set of downstream data lines 28. It is contemplated to also provide a set of upstream data lines, but this feature is not described here since the focus is on data writing operations.

The customized commands issued by the memory controller 12 may be structured somewhat differently from those listed in Table I, particularly when the clock-synchronized NAND flash devices are connected in a chain. An example of the customized command structure obeyed by the customized commands issued by the memory controller 12 is shown in Table II below:

TABLE II

| \multicolumn{5}{c}{Customized command structure} |
|---|---|---|---|---|
| Device Address | OP Code | RA | CA | DATA |
| 1 byte | 1 byte | 3 bytes | 2 bytes | 1-2112 bytes |

In Table II above, the "Device Address" field is used to specify a designated NAND flash device in the chain of NAND flash devices, while the "OP Code" field is an operation code uniquely indicative of a customized command. The remaining fields are optional and may include, depending on the customized command, the RA (row address field), the CA (column address field) and the DATA (field). Tables 1, 2 and 3 of the aforementioned International PCT Application PCT/CA2007/001428 show in greater detail a possibility for the customized command structure, in a non-limiting example embodiment.

In the specific case of a command for programming a portion of a specific page of data in the memory of a specific device, a pair of customized commands may be issued. The first command is a BURST DATA LOAD START customized command, which begins with the Device Address field identifying the specific device, followed by the "OP Code" filed that identifies the BURST DATA LOAD START command, followed by the CA field that specifies a starting address within the specific page. This is followed by the data to be written to the specific page (via a page buffer on the specific device), starting at the starting address.

The next customized command issued in the context of programming a portion of the specific page is a PAGE PROGRAM customized command, which begins with the Device Address field identifying the specific device and the "OP Code" field identifying the PAGE PROGRAM customized command. This is followed by the RA field that specifies a page address which is to be programmed with the data written in the page buffer of the specific device.

It should be appreciated that several instances of yet another customized command, namely the BURST DATA LOAD customized command, may occur one after the other between issuing the BURST DATA LOAD START customized command and issuing the PAGE PROGRAM customized command. The difference between the BURST DATA LOAD customized command and the BURST DATA LOAD START customized command is that the latter causes the page buffer of the specific device to be initialized whereas the former does not. This allows disjointed sections of the specific buffer to be written to, without having to write the entire page for each section.

Although the memory controller 12 described above is designed to function with a series interconnection of non-volatile memory devices that are specially adapted for communication with each other and with the memory controller 12, the memory controller 12 can nevertheless be made to function with an arrangement of conventional non-volatile memory devices such as the non-volatile memory devices $14_1$-$14_4$ shown in FIG. 1A. Specifically, this can be achieved by way of the bridge device 16, which is disposed between the memory controller 12 and the non-volatile memory devices $14_1$-$14_4$.

Bridge Device 16

Figure 1B:
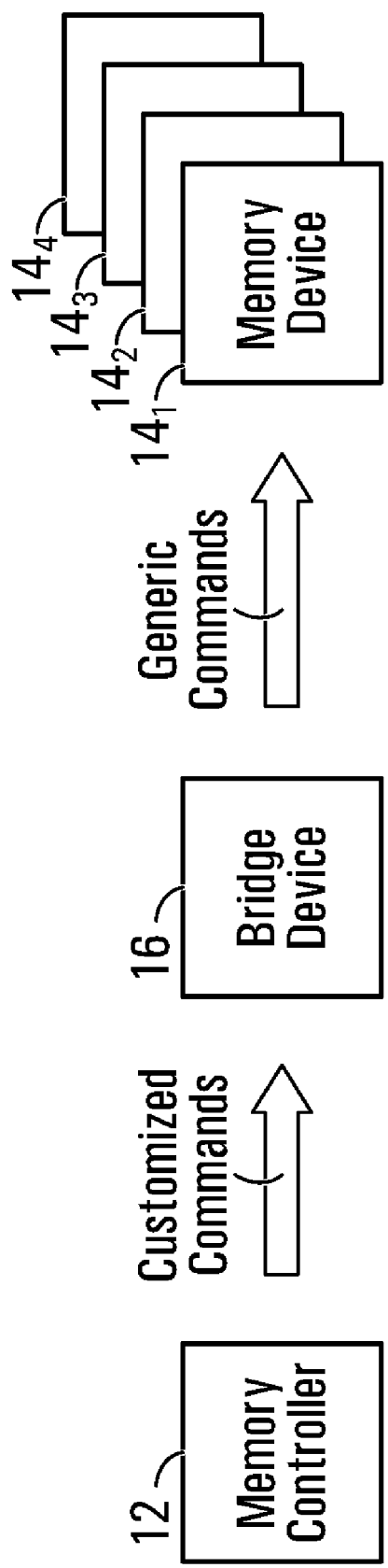
FIG. 1B conceptually illustrates a feature of the bridge device, which is to convert customized commands from the memory controller into generic commands for the non-volatile memory devices.

The bridge device 16 includes controller interface control logic block 29, device interface control logic block 30 and, for each of the non-volatile memory devices $14_1$-$14_4$, a corresponding managed memory module $32_1$-$32_4$. With reference to FIG. 1B, a main function of the bridge device 16 is to convert customized commands received from the memory controller 12 into generic commands destined for the non-volatile memory devices $14_1$-$14_4$.

Device interface control logic block 30 represents the aforementioned "external entity" to which is connected device control logic block 18 of each of the non-volatile memory devices $14_1$-$14_4$. More specifically, device interface control logic block 30 is connected to device control logic block 18 of each of the non-volatile memory devices $14_1$-$14_4$ by a respective set of control lines $34_1$-$34_4$ and a respective set of downstream data lines $36_1$-$36_4$. The sets of control lines $34_1$-$34_4$ and the sets of downstream data lines $36_1$-$36_4$ are used to convey commands and write data to the non-volatile memory devices $14_1$-$14_4$, respectively. A set of upstream data lines would also be provided for conveying read data from the non-volatile memory devices $14_1$-$14_4$, but this feature is not described here since the focus is on data writing operations.

Controller interface control logic block 29 is connected to the memory controller 12 by the set of control lines 26 and the set of downstream data lines 28. It should thus be noted that although the memory controller 12 may issue customized commands that are destined, from its point of view, for a target non-volatile memory device compatible with the memory controller 12 (e.g., a clock-synchronized NAND flash device), in actuality these customized commands are intercepted by controller interface control logic block 29 of the bridge device 16 along the set of control lines 26 and the set of downstream data lines 28.

Figure 2:
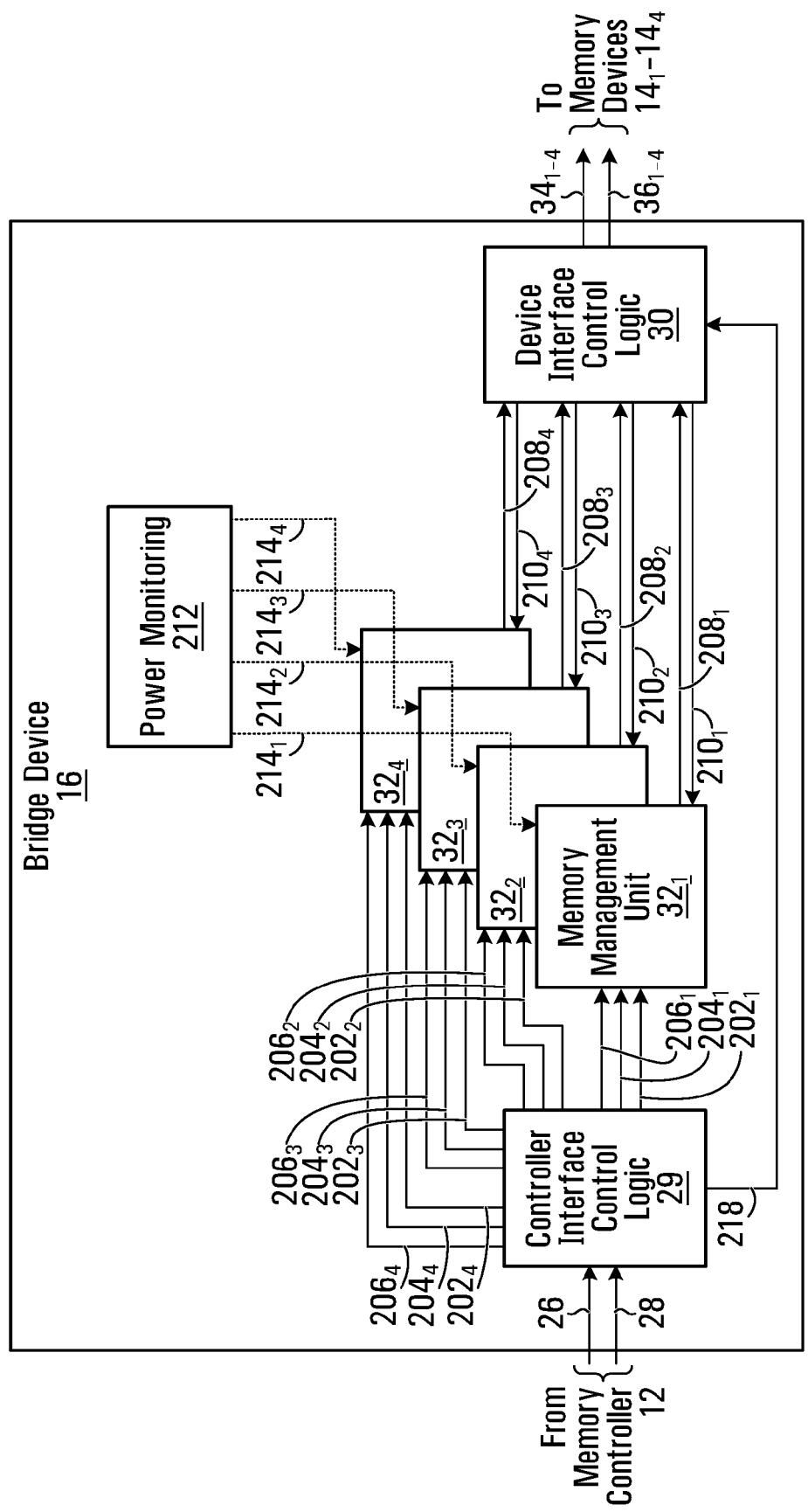
FIG. 2 is a block diagram of the bridge device in accordance with a possible embodiment, including a plurality of managed memory modules.

Reference is now made to FIG. 2, which provides further detail regarding the internal structure of the bridge device 16. It should be understood in what follows that signal lines carrying signals in addition to those and described shown may be provided in order to control and/or facilitate operation of the various components of the bridge device 16; however, they can be omitted for simplicity since their role is peripheral and their implementation will be readily understood by those of skill in the art.

Controller interface control logic block 29 derives various addresses, data and read/write signals that will be supplied to individual ones of the managed memory modules $32_1$-$32_4$ based on the customized commands received from the memory controller 12 along the set of control lines 26 and the set of downstream data lines 28. Specifically, controller interface control logic block 29 provides managed memory module $32_1$ with an address signal carried by a set of address lines $204_1$, an input data signal carried by a set of input data lines $202_1$ and a read/write signal carried by a respective read/write line $206_1$. Similarly, controller interface control logic block 29 provides managed memory module $32_2$ with an address signal carried by a set of address lines $204_2$, an input data signal carried by a set of input data lines $202_2$ and a read/write signal carried by a respective read/write line $206_2$. Similarly, controller interface control logic block 29 provides managed memory module $32_3$ with an address signal carried by a set of address lines $204_3$, an input data signal carried by a set of input data lines $202_3$ and a read/write signal carried by a respective read/write line $206_3$. Finally, controller interface control logic block 29 provides managed memory module $32_4$ with an address signal carried by a set of address lines $204_4$, an input data signal carried by a set of input data lines $202_4$ and a read/write signal carried by a respective read/write line $206_4$.

Each of the managed memory modules $32_1$-$32_4$ provides device interface control block 30 with respective output data signals $SO_1$-$SO_4$ carried by respective sets of output data lines $208_1$-$208_4$. In addition, controller interface control logic block 29 provides device interface control logic block 30 with a control signal $S_C$ carried by a link 218. The control signal $S_C$, which is formulated by controller interface control logic block 29 based on the customized commands received from the memory controller 12, indicates to the device interface control logic block 30 when it is time to transfer the output data signal received from a particular one of the managed memory modules $32_1$-$32_4$ towards the corresponding one of the non-volatile memory devices $14_1$ to $14_4$.

In addition, device interface control logic block 30 provides each of the managed memory modules $32_1$-$32_4$ with a respective first reset signal along a respective one of a plurality of reset lines $210_1$-$210_4$. In a non-limiting embodiment, device interface control logic block 30 is configured to assert the first reset signal on a given one of the reset lines $210_1$-$210_4$ after the confirmatory command cycle of the PAGE PROGRAM generic command has been sent by device interface control logic block 30 to the corresponding non-volatile memory device. (A possible sequence of events leading to transmittal of the PAGE PROGRAM generic command by device interface control logic block 30 will be described in further detail later on.)

Power monitoring circuitry 212 provides each of the managed memory modules $32_1$-$32_4$ with a respective second reset signal carried by a respective one of a plurality of reset lines $214_1$-$214_4$. In some embodiments, the various second reset signals carried by the reset lines $214_1$-$214_4$ may in fact be the same electrical signal. The power monitoring unit 212 is configured to assert the second reset signal carried by the reset lines $214_1$-$214_4$ whenever it detects that power has been established (or re-established) to the bridge device 16. In an alternative embodiment, the power monitoring circuitry 212 can be incorporated into the controller interface control logic block 29, whereby assertion of the second reset signal is carried out based on detection of a combination of logic values present on certain incoming signals (such as, for example, reset, chip enable and/or chip select, to name a few non-limiting possibilities), which combination occurs in the unique event that power has been established (or re-established) to the bridge device 16.

Figure 3A:
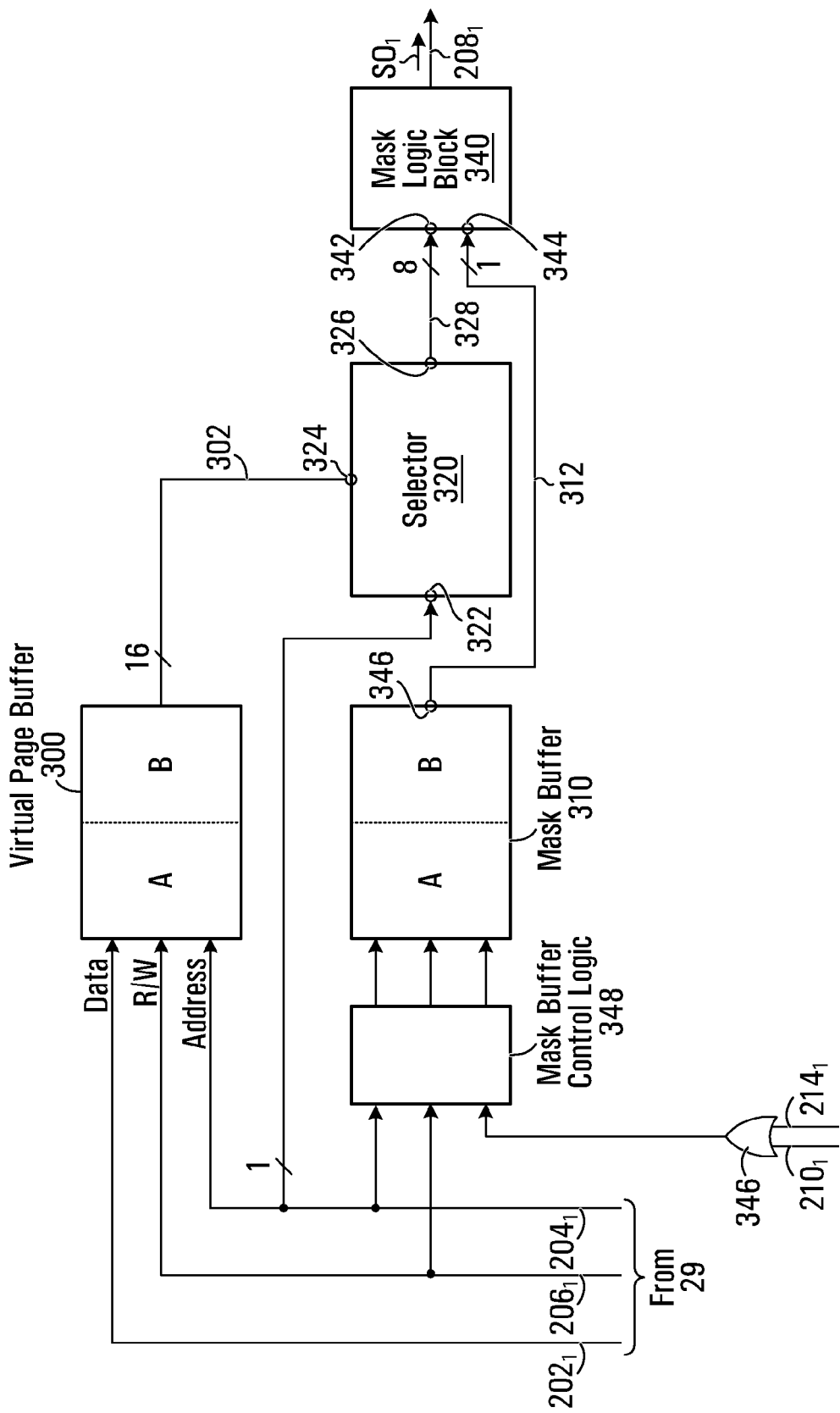
FIG. 3A is a block diagram of one of the managed memory modules in accordance with a possible embodiment, including a mask logic block.

Reference is now made to FIG. 3A, which provides further detail regarding the structure of a particular one of the managed memory modules $32_1$-$32_4$, in this case managed memory module $32_1$. It should be appreciated that a similar description would apply to the other managed memory modules $32_2$, $32_3$, $32_4$. As illustrated, managed memory module $32_1$ comprises a virtual page buffer 300 and a mask buffer 310.

Figure 11:
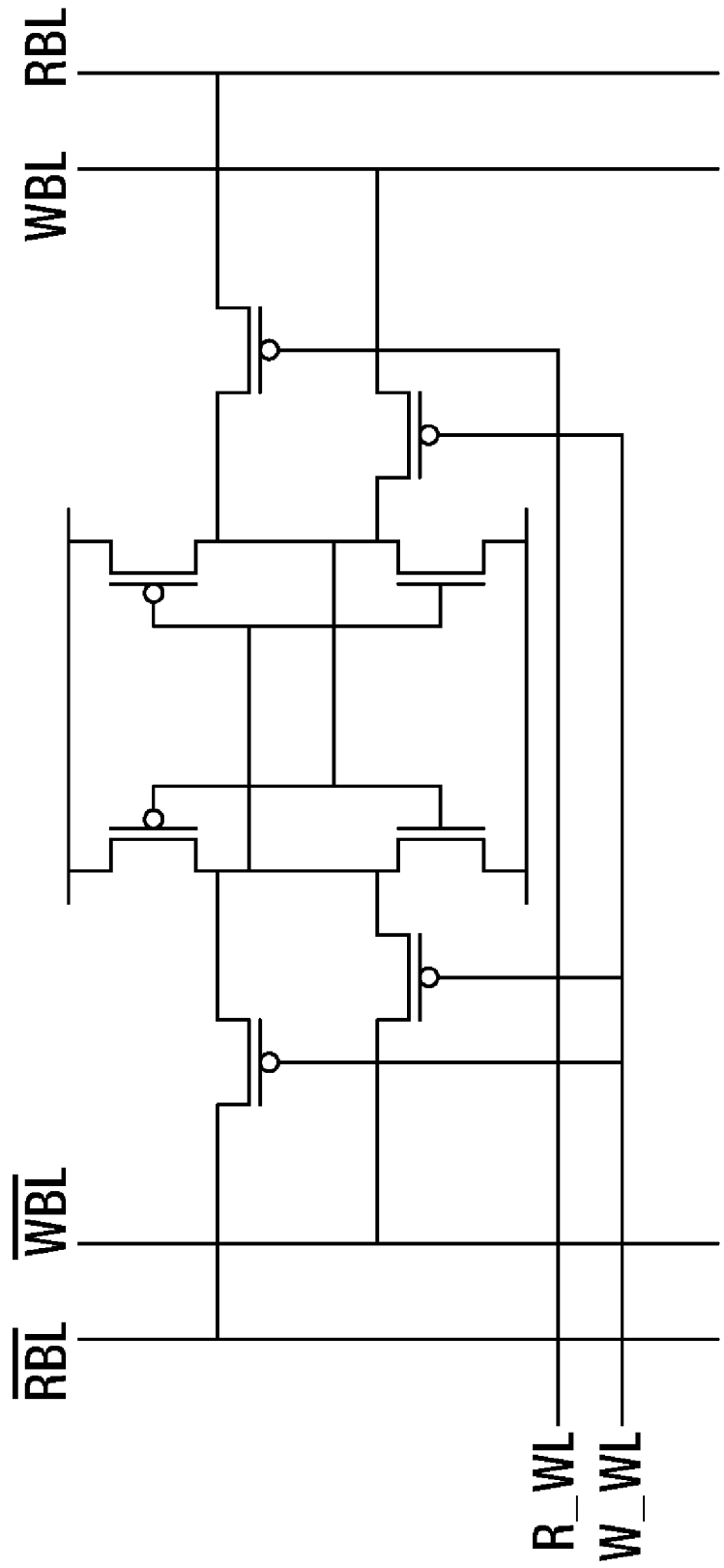
FIG. 11 is a transistor level block diagram illustrating a possible internal structure of a memory cell used in the composition of the virtual page buffer and the mask buffer.

In a specific non-limiting embodiment, the virtual page buffer 300 and the mask buffer 310 are composed of static random access memory (SRAM), although this is not a requirement of the present invention. A suitable SRAM cell structure that may be used in certain non-limiting embodiments is a dual-port structure of the type shown in FIG. 11. Other memory technologies may be used for either or both of the virtual page buffer 300 and the mask buffer 310, including, without limitation, dynamic random access memory (DRAM).

The virtual page buffer 300 comprises an arrangement of data elements (e.g., SRAM cells) mirroring the data elements in the device page buffer 22 of the corresponding non-volatile memory device, in this case non-volatile memory device $14_1$. The virtual page buffer 300 temporarily stores data that will eventually be transferred to the device page buffer 22 in non-volatile memory device $14_1$. The virtual page buffer 300 is populated over time based on the address, data and read/write signals received from controller interface control logic block 29 along the set of address lines $204_1$, the set of input data lines $202_1$, and read/write line $206_1$.

Specifically, during a write operation (i.e., when the read/write signal carried by read/write line $206_1$ encodes a "WRITE MODE"), the address signal carried by the set of address lines $204_1$ specifies a location within the virtual page buffer 300 where the input data signal carried by the set of input data lines $202_1$ is to be written. On the other hand, data transfer out of the virtual page buffer 300 occurs during a read operation. Specifically, when the read/write signal carried by read/write line $206_1$ encodes a "READ MODE", the address signal carried by the set of address lines $204_1$ specifies an address within the virtual page buffer 300 whose contents are to be extracted. These contents are placed onto a set of data lines 302.

It should be appreciated that in the present non-limiting embodiment, two planes (A and B) are provided and thus the virtual page buffer 300 may be conceptually divided into two sections, one associated with plane A and the other associated with plane B. In the present non-limiting example, the data elements in each plane are eight bits (one byte) in length. The plane associated with particular data to be written to the virtual page buffer 300 can be encoded in a bit occupying a pre-determined bit position in the address of the particular data. Similarly, the plane associated with particular data to be extracted from the virtual page buffer 300 is encoded in a bit occupying a pre-determined bit position in the address of the particular data.

In order to cause the data associated with a selected plane to be passed to device interface control logic block 30 along the set of output data lines $208_1$, there is provided a selector 320. In this case, where eight-bit (8-bit) words and two (2) planes are employed, the selector 320 has an input 324 with a width of sixteen (16) data bits, an output 326 with a width of eight (8) data bits and a one-bit (1-bit) control input 322. The control input 322 is provided so as to allow selection, at the output 326, of either the first group of eight (8) bits or the second group of eight (8) bits of the sixteen-bit (16-bit) signal at the input 324. The control input 322 is fed with the signal carried by one of the address lines $204_1$, namely the one encoding a bit that occupies the aforementioned pre-determined bit position. The output 326 of the selector 320 is connected along a set of data lines 328 to a first input 342 of mask logic block 340.

A second input 344 of mask logic block 340 leads from an output of the mask buffer 310, which is now described. More specifically, the mask buffer 310 comprises an arrangement of data elements (e.g., SRAM cells) that are in correspondence with the data elements in the virtual page buffer 300. Thus, each data element in the mask buffer 310 has a corresponding data element in the virtual page buffer 300. However, the data elements in the mask buffer 310 need not encode the same values as the data elements in the virtual page buffer 300. In the illustrated embodiment, the data elements in the virtual page buffer 300 are each eight bits in length, while the data elements in the mask buffer 310 are each only a single bit in length. Of course, as will be apparent to those of skill in the art, other ratios between the size (in bits) of the data elements in the virtual page buffer 300 and the size (in bits) of the data elements in the mask buffer 310 are possible including, without limitation, 1:1, 4:1, 16:1 and others.

The first reset signal (received along reset line $210_1$) and the second reset signal (received along reset line $214_1$) are combined by a two-input logic OR module 346 whose output is provided to mask buffer control logic block 348. The output of the logic OR module 346 serves as a trigger to clear the mask buffer 310. To be precise, clearing of the mask buffer 310 is to be triggered if power has been established (or re-established) to the bridge device 16 or if the confirmatory command cycle of the PAGE PROGRAM generic command has been sent by device interface control logic block 30 to non-volatile memory device $14_1$. In the case of NAND Flash memory, only logic 0 can be programmed into a memory cell of the non-volatile memory devices $14_1$-$14_4$, while logic 1 signifies "program inhibit". In such circumstances, mask buffer control logic block 348 clears the mask buffer 310 by forcibly setting all the data elements in the mask buffer 310 to logic 1.

In accordance with an embodiment of the present invention, after the mask buffer 310 is cleared and all of its data elements are set to a given logic state (in this case, logic 1), a given data element in the mask buffer 310 is encoded with the opposite logic state (in this case, logic 0) when the corresponding data element in the virtual page buffer 300 is being (or has been) written to. Therefore, during (or shortly after) a write operation (i.e., when the read/write signal carried by read/write line $206_1$ encodes the "WRITE MODE"), mask buffer control logic block 348 causes logic 0 to be written to those data elements within the mask buffer 310 whose addresses are encoded by the address signal carried by the set of address lines $204_1$.

Figure 4:
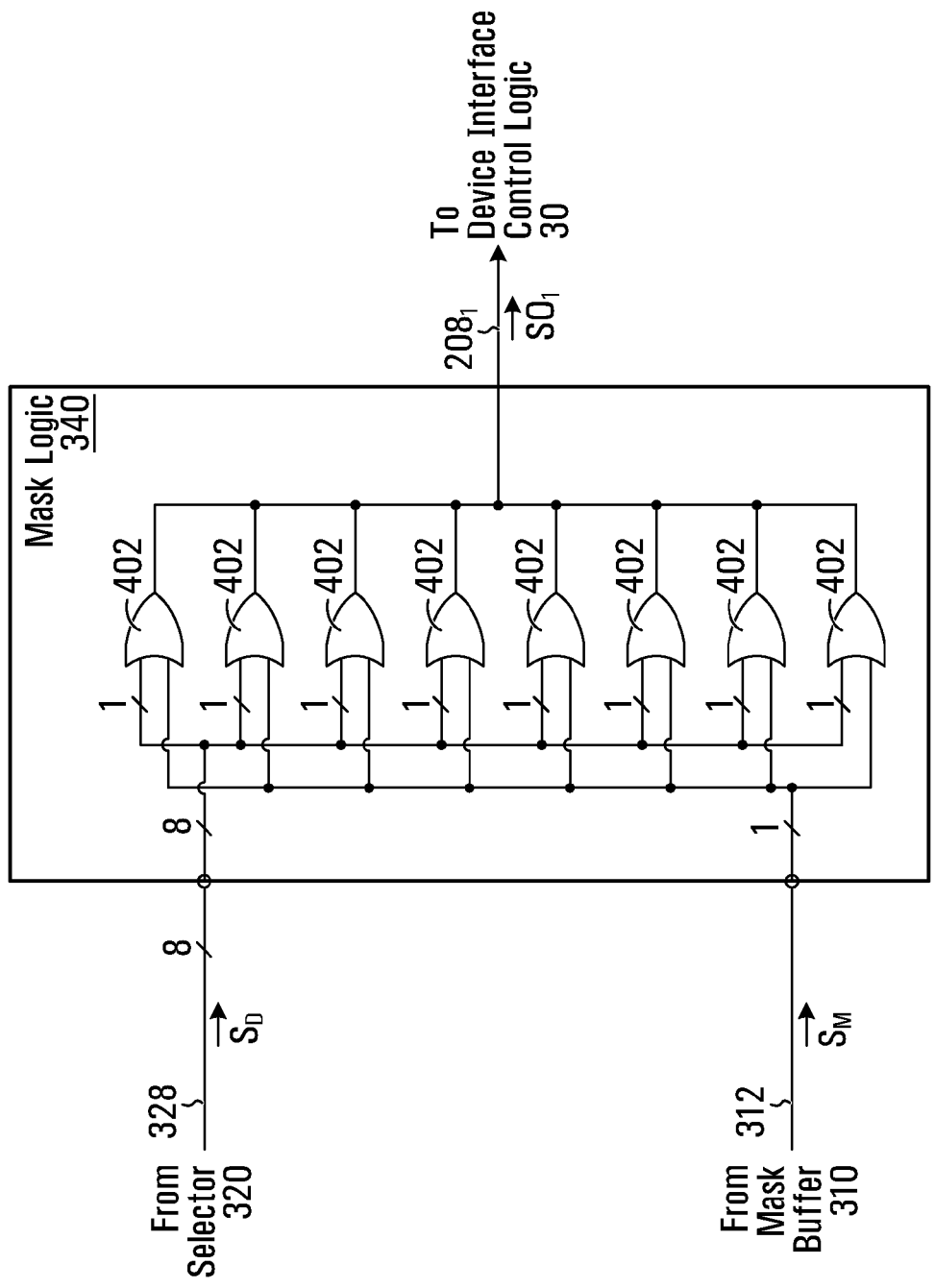
FIG. 4 is a block diagram of the mask logic block in accordance with a possible embodiment.

Data transfer out of the mask buffer 310 occurs during a read operation, in tandem with data transfer out of the virtual page buffer 300 described above. Specifically, when the read/write signal carried by read/write line $206_1$ encodes the "READ MODE", the set of address lines $204_1$ specifies a location within the mask buffer 310 whose contents are to be extracted. The contents of that address (which, it is recalled, will be either logic 0 or logic 1) are placed onto a mask data line 312 via the output of the mask buffer 310. The mask data line 312 leads to the second input 344 of the mask logic block 340, which is now described in greater detail with reference to FIG. 4.

Specifically, mask logic block 340 receives a mask signal $S_M$ carried by the mask data line 312 and a data signal $S_D$ carried by the set of data lines 328. Mask logic block 340 includes a bank of two-input logic OR modules 402, where the number of logic OR modules 402 depends on the width (in bits) of the data signal $S_D$. In this case, there are eight (8) logic OR modules 402 but it should be appreciated that this is not a limitation of the present invention. Also, the reference to logic OR modules 402 is merely to illustrate the functionality of mask logic block 340. It is to be understood that various ways of implementing such functionality will become apparent to those of skill in the art.

The output of the logic OR modules 402 is the output data signal $SO_1$ provided to device interface control logic block 30 along the set of output data lines $208_1$. It should be appreciated that the output data signal $SO_1$ will be set to all logic 1 when the mask signal $S_M$ was set to logic 1, whereas it will reflect the data signal $S_D$ when the mask signal $S_M$ was set to logic 0. It is recalled, of course, that the mask signal $S_M$ will be set to logic 0 only if the data element in the virtual page buffer 300 at the memory location encoded by the address signal carried by the set of address lines $204_1$ has been written to since the last time that the mask buffer 310 was cleared.

An example of operation is now provided by way of illustration only. In this example, operation of the bridge device 16 and managed memory module $32_1$ is followed along a temporal series of stages denoted A through E. Accordingly, reference will be made to FIGS. 5 through 10, each of which shows, by way of example only, possible contents of the device page buffer 22, the virtual page buffer 300, the mask buffer 310 and a portion of a given device page 502 during various ones of these stages. For example purposes, the device page 502 can be considered to be page #456 at block #123 in the memory core 20 of non-volatile memory device $14_1$. Also, the dimensions of the device page buffer 22, the virtual page buffer 300, the mask buffer 310 and the device page 502 have been selected to facilitate illustration but are by no means limiting.

Stage A

Figure 5:
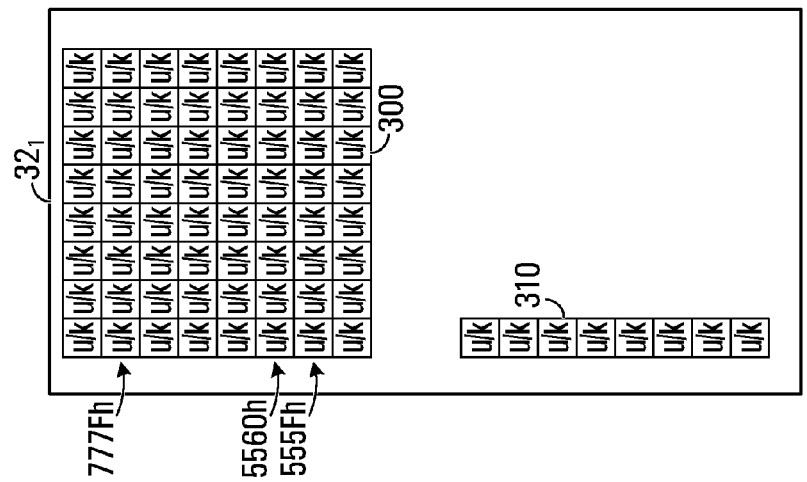

Let it be assumed that power is established (or re-established) to the bridge device 16, but this scenario is not yet detected by the power monitoring unit 212. The power monitoring unit 212 has thus not yet issued the second reset signal on reset line $214_1$. FIG. 5 shows the contents of the virtual page buffer 300 and the mask buffer 310 at this point in time. It is noted that the state of the individual data elements in the virtual page buffer 300 and the mask buffer 310 is unknown (denoted "u/k"). This is due to the fundamental structure of SRAM cells, whereby the logic state (0 or 1) acquired by a given memory cell after power-up will be random, as it depends to a certain extent on (unpredictable) transient node voltage fluctuations during power-up. FIG. 5 also shows the contents of the device page buffer 22, whose data elements can have a particular distribution of ones and zeros that may be known or unknown at the current time. In addition, FIG. 5 shows the contents of the device page 502, which may be known to, or relied upon by, a user or system at the current time.

Stage B

Figure 6:
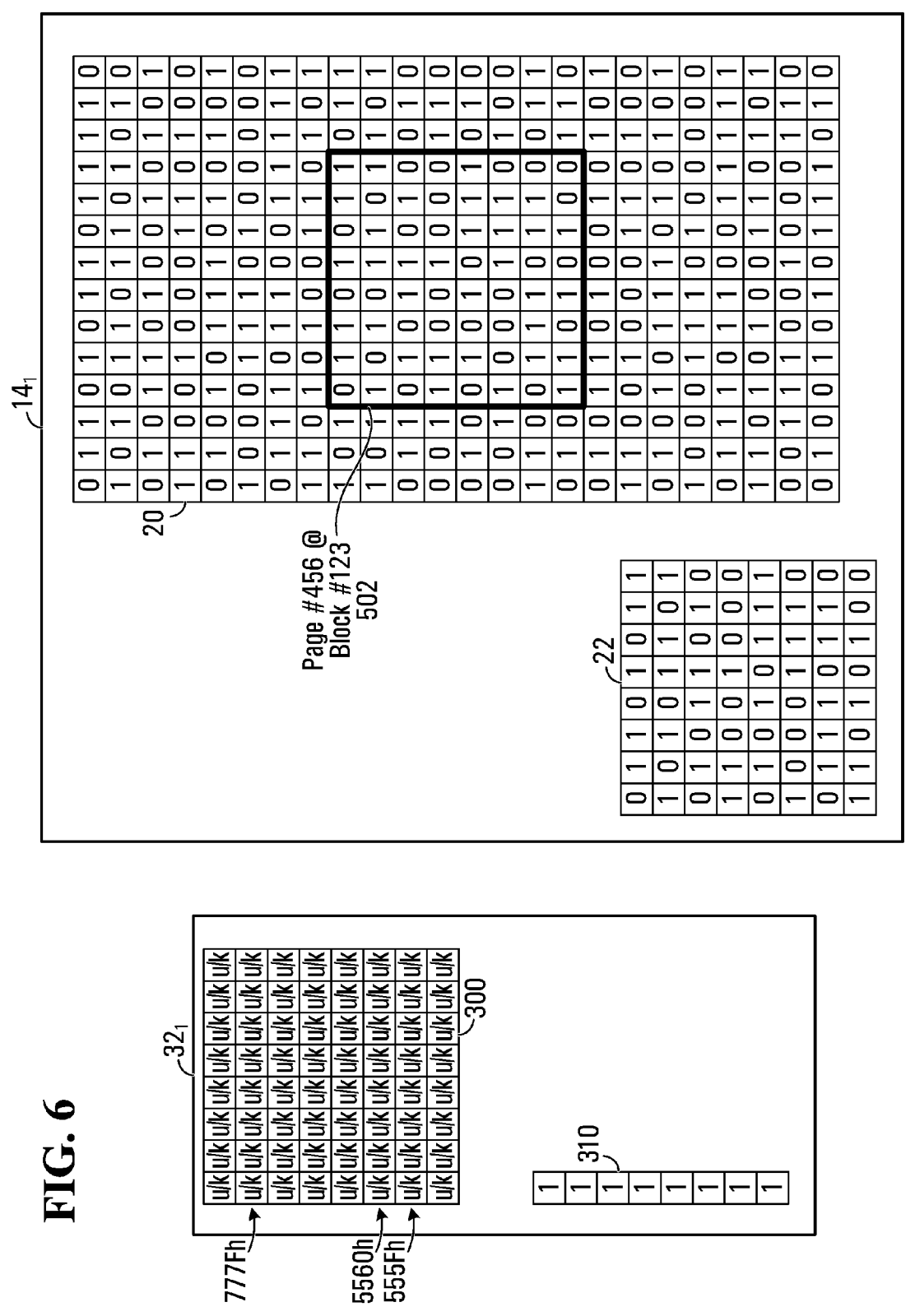

The power monitoring unit 212 issues the second reset signal on reset line $214_1$. The second reset signal may also be issued on reset lines $214_2$, $214_3$ and $214_4$, although this is not important for the purposes of the present example. The second reset signal reaches the mask buffer control logic block 348 via the logic OR module 346. In response, the mask buffer control logic block 348 clears the mask buffer 310 which, as mentioned above, results in all the data elements in the mask buffer 310 being set to logic 1. FIG. 6 shows the contents of the virtual page buffer 300, the mask buffer 310, the device page buffer 22 and the device page 502 shortly after clearing of the mask buffer 310. It is noted that the contents of the virtual page buffer 300, the device page buffer 22 and the device page 502 have remained unchanged from the situation in FIG. 5.

Stage C

Let it now be assumed that the memory controller 12 issues a first customized command, containing the following information:

Device Address=$14_1$
OP Code=BURST DATA LOAD START
RA/CA=Block #123, Page #456, Starting Word 555Fh
DATA=00101101, 10101001

It is noted that for illustrative purposes the Device Address has been selected to identify non-volatile memory device $14_1$, while the block and page values have been selected so as to identify the exact same device page 502 referred to above with reference to FIGS. 5 and 6. The first customized command is received at the bridge device 16 along the set of control lines 26 and the set of downstream data lines 28. The first customized command is processed by controller interface control logic block 29, which recognizes that the first customized command requires access to managed memory module $32_1$, based on the Device Address encoded within the first customized command. Accordingly, the value 555Fh is encoded into the address signal, which is sent to managed memory module $32_1$ along the set of address lines $204_1$. It is assumed that the address signal also encodes the appropriate plane (e.g., A or B), if applicable. In addition, the value 00101101 is encoded into the input data signal, which is sent to managed memory module $32_1$ along the set of input data lines $202_1$. Also, based on the OP Code encoded within the first customized command, controller interface control logic block 29 encodes the "write mode" into the read/write signal, which is sent to managed memory module $32_1$ along read/write line $206_1$.

Next, while continuing to encode the read/write signal with the "write mode", the address is incremented to the value 5560h, which is encoded into the address signal sent to managed memory module $32_1$ along the set of address lines $204_1$. In addition, the value 10101001 is encoded into the input data signal, which is sent to managed memory module $32_1$ along the set of input data lines $202_1$.

Meanwhile, the block and page values (in this case, Block #123, Page #456) will be stored by controller interface control logic block 29 for future use, such as in the event that the memory controller 12 issues a subsequent BURST DATA LOAD customized command to write additional data to the current page, or issues a PAGE PROGRAM customized command.

Further to the above, the virtual page buffer 300 is written to at memory location 555Fh with the value 0101101 and is written to at memory location 5560h with the value 10101001. Additionally, the mask buffer control logic block 348 sets the corresponding data elements of the mask buffer 310 to logic 0.

Let it now be assumed that the memory controller 12 then issues a second customized command, containing the following information:

Device Address=$14_1$
OP Code=BURST DATA LOAD
CA=Starting Word 777Fh (RA is not used)
DATA=11010000

The second customized command is again received at the bridge device 16 along the set of control lines 26 and the set of downstream data lines 28. The second customized command is processed by controller interface control logic block 29, which recognizes, based on the Device Address encoded within the second customized command, that the second customized command requires access to the same managed memory module $32_1$ as did the BURST DATA LOAD START customized command. Here, it is noticed that the block and page are omitted from the CA information, which implies that data is to be written to the same page as the one that was just written to as a result of the first customized command. Accordingly, the value 777Fh is encoded into the address signal, which is sent to managed memory module $32_1$ along the set of address lines $204_1$. Again, it is assumed that the address signal also encodes the appropriate plane (e.g., A or B), if applicable. In addition, the value 11010000 is encoded into the input data signal, which is sent to managed memory module $32_1$ along the set of input data lines $202_1$. Also, based on the OP Code encoded within the second customized command, controller interface control logic block 29 again encodes the "write mode" into the read/write signal, which is sent to managed memory module $32_1$ along read/write line $206_1$.

Further to the above, the virtual page buffer 300 is written to, at memory location 777Fh, with the value 11010000. Additionally, the mask buffer control logic block 348 sets the corresponding data element of the mask buffer 310 to logic 0.

It should be noted that non-volatile memory device $14_1$, although seemingly the target recipient of the first and second customized commands (based on the Device Address), has remained idle while the first and second customized commands were intercepted and processed by the bridge device 16.

Figure 7:
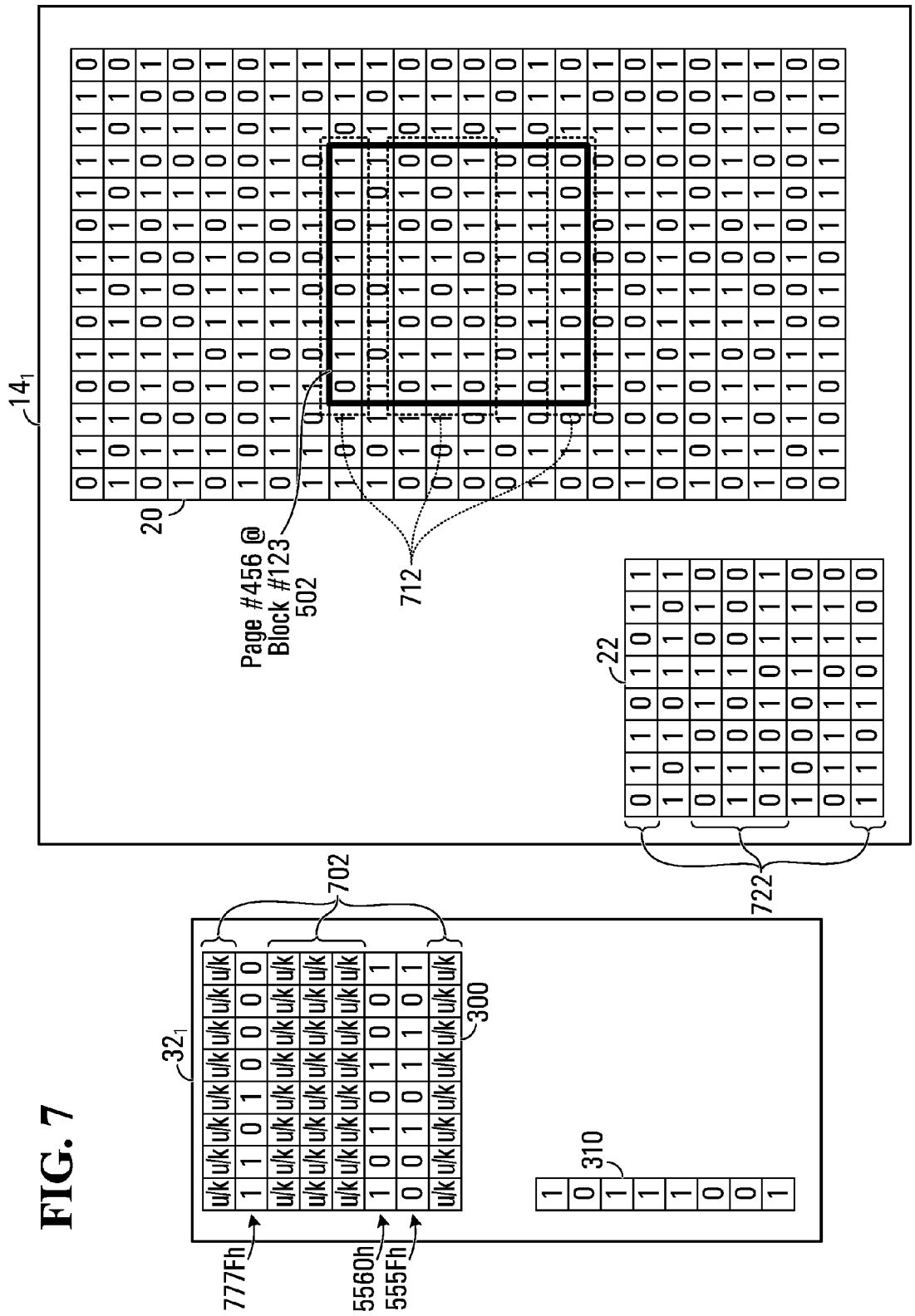

FIG. 7 shows the contents of the virtual page buffer 300, the mask buffer 310, the device page buffer 22 and the device page 502 shortly after processing of the second customized command has resulted in an effect on the virtual page buffer 300. It is seen that a certain number of data elements 702 in the virtual page buffer 300 still have unknown values, including data elements between memory locations 5560h and 777Fh. However, the corresponding data elements 712 in the device page 502 have values that are not necessarily unknown and therefore should not be gratuitously altered. For this reason, and as will be shown below, the corresponding data elements 722 in the device page buffer 22 will have to be set to logic 1, thereby to inhibit a programming operation from taking place on the data elements 712 in the device page 502.

Stage D

Now consider that the memory controller 12 issues a third customized command, containing the following information:

Device Address=$14_1$
OP Code=PAGE PROGRAM

The third customized command is received at the bridge device 16 along the set of control lines 26 and the set of downstream data lines 28. The third customized command is processed by controller interface control logic block 29, which recognizes, based on the Device Address encoded within the third customized command, that the third customized command requires access to the same managed memory module $32_1$ as did the first and second customized commands. Based on the different OP Code, however, controller interface control logic block 29 recognizes that it is time for data to be transferred from the virtual page buffer 300 to the device page buffer 22 in non-volatile memory device $14_1$.

To this end, controller interface control logic block 29 encodes an initial value 0000h into the address signal sent to managed memory module $32_1$ along the set of address lines $204_1$. In addition, controller interface control logic block 29 encodes the "read mode" into the read/write signal, which is sent to managed memory module $32_1$ along read/write line $206_1$. In response, the virtual page buffer 300 will place the contents of its data element located at address 0000h onto the set of data lines 302. In addition, the mask buffer 310 will place the contents of the corresponding data element located at address 0000h onto the mask data line 312 via the output of the mask buffer 310. As described earlier, the mask data line 312 and the set of data lines 302 lead to mask logic block 340 (via the selector 320 in the case of the set of data lines 302), which provides output data signal $SO_1$ to device interface control logic block 30 along the set of output data lines $208_1$. After a brief period of time required to complete the read operation, controller interface control logic block 29 encodes the next value 0001h into the address signal sent to managed memory module $32_1$ along the set of address lines $204_1$, and so on, until all memory locations in the virtual page buffer 300 (and the mask buffer 310) have been read from.

Meanwhile, controller interface control logic block 29 sends the control signal $S_C$ to device interface control logic block 30 along the link 218. The control signal $S_C$ provides the necessary control information to allow device interface control logic block 30 to issue a generic command that will be understood by non-volatile memory device $14_1$ and that will result in data being written to non-volatile memory device $14_1$. Accordingly, the control signal $S_C$ may specify the required operation and its associated parameters. In this non-limiting example, the required operation is issuance of the PAGE PROGRAM generic command and its associated parameters are the identity of Page #456 within Block #123 of non-volatile memory device $14_1$. In a multi-plane embodiment, the appropriate plane may also be specified.

In response to receipt of the control signal $S_C$ from controller interface control logic block 29, device interface control logic block 30 conveys the PAGE PROGRAM generic command and write data (which corresponds to output data signal $SO_1$ received from managed memory module $32_1$ along the set of output data lines $208_1$) to non-volatile memory device $14_1$ using the set of control lines $34_1$ and the set of downstream data lines $36_1$. In this way, the entire contents of the virtual page buffer 300 will be transferred to the device page buffer 22 in non-volatile memory device $14_1$.

Figure 8:
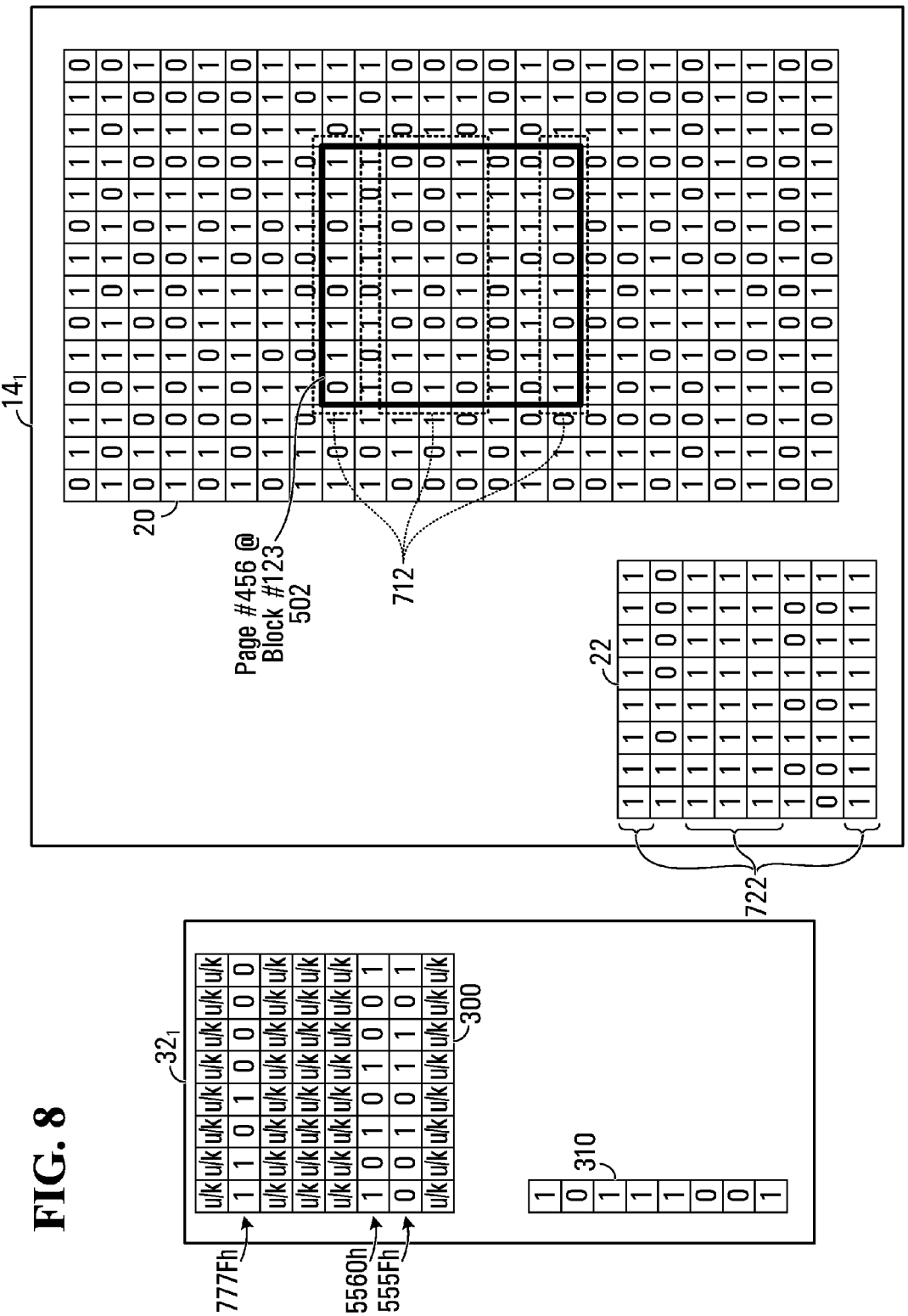

It is recalled that the PAGE PROGRAM generic command includes an initial command cycle, subsequent address and data cycles, and a confirmatory command cycle. FIG. 8 shows the contents of the virtual page buffer 300, the mask buffer 310, the device page buffer 22 and the device page 502, once the device page buffer 22 has been written to as a result of the initial command cycle and the subsequent address and data cycles, but before the contents of the page buffer 22 has been transferred to the device page 502. There is of course no change in the contents of the virtual page buffer 300 or the mask buffer 310. However, it is seen that the data elements 722 in the device page buffer 22 have been set to logic 1, while the other data elements in the device page buffer 22 match the corresponding data elements in the virtual page buffer 300. This will have the effect of preserving the current value of the data elements 712 (in the device page 502) when the device page buffer 22 is transferred to the memory core 20.

Indeed, this is seen in FIG. 9, which shows the contents of the virtual page buffer 300, the mask buffer 310, the device page buffer 22 and the device page 502, once non-volatile memory device $14_1$ has fully processed the confirmatory command cycle in the PAGE PROGRAM generic command. It is seen that the only data elements in the device page 502 whose values have changed from logic 1 to logic 0 are those whose corresponding data elements in the device page buffer 22 had the value of logic 0.

Stage E

Having conveyed the confirmatory command cycle of the PAGE PROGRAM generic command, device interface control logic block 30 issues the first reset signal on reset line $210_1$. (Meanwhile, device control logic block 18 of non-volatile memory device $14_1$ may be processing the confirmatory command cycle of the PAGE PROGRAM generic command.) The second reset signal reaches the mask buffer control logic block 348 via the logic OR module 346. In response, the mask buffer control logic block 348 clears the mask buffer 310 which, as mentioned above, results in all the data elements in the mask buffer 310 being set to logic 1. FIG. 10 shows the contents of the virtual page buffer 300 and the mask buffer 310 shortly after clearing of the mask buffer 310. It is noted that the contents of the virtual page buffer 300, the device page buffer 22 and the device page 502 has remained unchanged.

In view of the foregoing, it should be apparent that when a bridge device is used to temporarily store a virtual page buffer for a device page buffer, and when the bridge device functions so as to transfer the entire virtual page buffer to the device page buffer regardless of the number of words to be actually written to a target page (thereby leaving certain data elements in the virtual page buffer unused), certain embodiments of the system described herein can avoid unintended alteration of data in the target page that would otherwise arise due to certain ones of the unused data elements in the virtual page buffer having randomly acquired, at certain times such as after power up, a logic state that is contrary to a program inhibit state.

Those skilled in the art will appreciate that numerous variants are within the scope of the invention. For example, although there may be a difference in size between the data elements in the virtual page buffer 300 and the data elements in the mask buffer 310, the mask buffer 310 may nevertheless be configured to have the same input/output specifications. A commercially available SRAM compiler (such as the Artisan® SRAM compiler, available from ARM Ltd., Cambridge, United Kingdom, to name but one specific non-limiting example), can be programmed to generate two SRAM memory blocks that are identical except for their size.

Figure 3B:
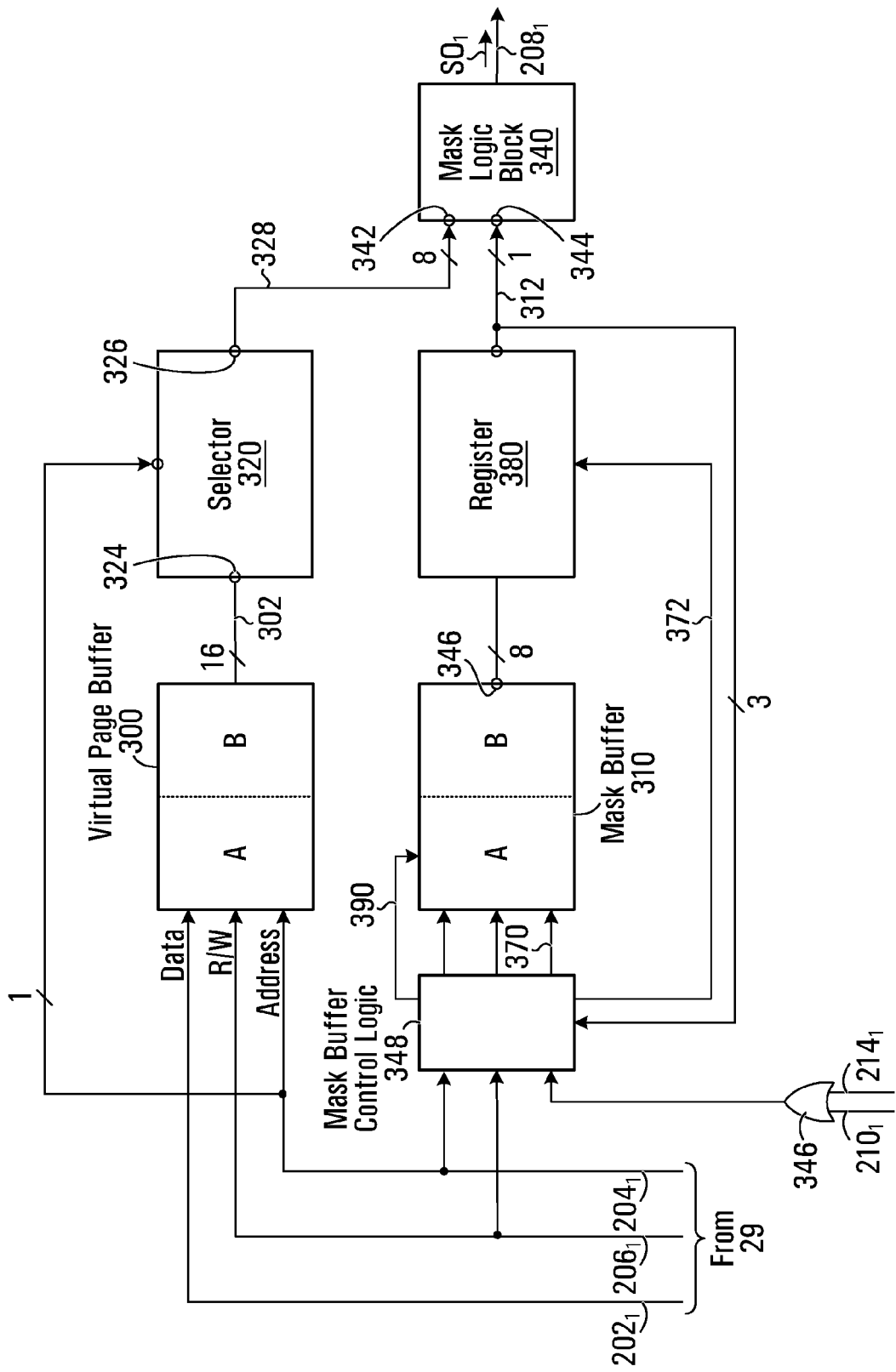
FIG. 3B is a block diagram of one of the managed memory modules in accordance with another possible embodiment.

FIG. 3B is illustrative of the case where the mask buffer 310 and the virtual page buffer 300 are constructed as separate memory blocks that are identical but for their size, whereby the virtual page buffer 300 is eight (8) times larger than the mask buffer 310. In this particular example, the data elements in the virtual page buffer 300 and the mask buffer 310 can be written to and read from only in whole-byte increments (for the purposes of the present example, only a single plane is assumed to exist). Thus, while the address encoded by the set of address lines $204_1$ defines a target byte of the virtual page buffer 300, this very same address encodes a target position within a target byte of the mask buffer 310. Accordingly, for the purposes of accessing the mask buffer 310, the address lines are split into two components, namely a first address component 370 (which includes all but three of the address lines $204_1$ and which specifies the target byte of the mask buffer 310), and a second address component 372 (which includes the remaining three address lines and which specifies the target position within the target byte).

During a read operation involving the target position within the target byte, the first address component 370 is provided to the mask buffer 310. Mask buffer control logic block 348 also sets the read/write line (not shown) to "READ MODE". In response, the target byte is extracted from the mask buffer 310, and is fed to a bit-addressable register 380 that is controlled by the second address component 372. The size of the register 380 corresponds to the size of the data that can be extracted from the mask buffer 310, in this case one byte. Based on the information encoded in the second address component 372, the register 380 then outputs the target bit along the mask data line 312 in the form of the previously described mask signal $S_M$.

On the other hand, a two-step process is performed during a write operation involving the target position within the target byte, first involving a read operation then a write operation. Specifically, the first address component 370 is provided to the mask buffer 310, while mask buffer control logic block 348 sets the read/write line to "READ MODE". In response, the target byte is extracted from the mask buffer 310, and is fed to the aforementioned bit-addressable register 380 that is controlled by the second address component 372. The full output of the register 380 (i.e., the target byte) is fed back to mask buffer control logic block 348, which then modifies only the target bit based on the information encoded in the second address component, leaving the other bits of the target byte intact. Meanwhile, the first address component 370 continues to be provided to the mask buffer 310. At this stage, mask buffer control logic block 348 sets the read/write line to "WRITE MODE" and provides the modified target byte (i.e., with the modified target bit) along a set of data lines 390. In response, the modified target byte is written to the mask buffer 310.

Those skilled in the art should appreciate however that there is no specific requirement that the granularity of access to the mask buffer 310, 1110 be finer, the same or coarser than the granularity of access to the virtual page buffer 300, 1100.

It should also be appreciated that in some embodiments, all or part of the bridge device 16 and/or the managed memory modules $32_1$-$32_4$ can be manufactured based on a low-level hardware description obtained using a logic synthesis tool that is run on a computing device. The logic synthesis tool is configured to read source code containing a functional description of the bridge device 16 and/or the managed memory modules $32_1$-$32_4$ (e.g., in a language such as HDL, VHDL or Verilog, to name a few non-limiting possibilities) and to output a definition of the physical implementation of a circuit suitable for implementing corresponding functionality.

In the examples described above, the device, elements and circuits are connected to each other as shown in the figures, for the sake of simplicity. In practical applications of the present invention, elements, circuits, etc. may be connected directly to each other. As well, elements, circuits etc. may be connected indirectly to each other through other elements, circuits, etc., necessary for operation of the devices or apparatus. Thus, in actual configuration, the devices, elements and circuits are directly or indirectly coupled with or connected to each other.

Certain adaptations and modifications of the described embodiments can be made. Therefore, the above discussed embodiments are to be considered illustrative and not restrictive.

What is claimed is:

1. A semiconductor device for transferring input data to a non-volatile memory device, the semiconductor device comprising:
   a virtual page buffer including a plurality of data elements;
   a mask buffer including a plurality of data elements, each of the data elements of the mask buffer corresponding to a respective one of the data elements of the virtual page buffer;
   control logic circuitry for (i) setting each of the data elements of the mask buffer to a first logic state upon receipt of a trigger; (ii) causing input data to be written to selected ones of the data elements of the virtual page buffer; and (iii) causing those data elements of the mask buffer corresponding to the selected ones of the data elements of the virtual page buffer to be set to a second logic state different from the first logic state;
   mask logic circuitry configured to provide masked output data by combining, for each of the data elements of the virtual page buffer, data read therefrom together with the logic state of the corresponding one of the data elements of the mask buffer; and
   an output interface configured to release the masked output data towards the non-volatile memory device.

2. The semiconductor device defined in claim 1, further comprising power monitoring circuitry configured to issue a signal when power is established or re-established to the semiconductor device, said signal resulting in said trigger.

3. The semiconductor device defined in claim 1, wherein the output interface is further configured to release the masked output data as part of a PAGE PROGRAM command released towards the non-volatile memory device.

4. The semiconductor device defined in claim 3, wherein release of the PAGE PROGRAM command towards the non-volatile memory device comprises issuance of an initial command cycle, at least one address cycle, at least one data cycle and a confirmatory command cycle.

5. The semiconductor device defined in claim 4, wherein the output interface is further configured to issue a signal upon issuance of the confirmatory command cycle, said signal resulting in said trigger.

6. The semiconductor device defined in claim 1, wherein a particular data element of the virtual page buffer is addressable by a particular address, wherein the control logic circuitry is capable of supplying an address signal encoding said particular address and a read signal, and wherein the virtual page buffer is responsive to receipt of the address signal and the read signal to cause contents of the particular data element of the virtual page buffer to be read and provided to the mask logic circuitry.

7. The semiconductor device defined in claim 6, wherein the mask buffer is responsive to receipt of the address signal and the read signal to cause the logic state of the data element of the mask buffer corresponding to the particular data element of the virtual page buffer to be read and provided to the mask logic circuitry.

8. The semiconductor device defined in claim 6, further comprising a selector, wherein the mask buffer is responsive to receipt of the read signal and a portion of the address signal to cause a particular data element of the mask buffer to be read and provided to an input of the selector.

9. The semiconductor device defined in claim 8, wherein the selector has an output and is configured to admit towards its output a portion of the signal at its input, the portion being specified by a remainder of the address signal such that the signal at the output of the selector is indicative of the logic state of the data element of the mask buffer corresponding to the particular data element of the virtual page buffer.

10. The semiconductor device defined in claim 1, wherein the selected ones of the data elements of the virtual page buffer are addressable by particular addresses, wherein the control logic circuitry is capable of supplying an address signal encoding said particular addresses and a write signal, wherein the virtual page buffer is responsive to receipt of the address signal and the write signal to cause the input data to be written to the selected ones of the data elements of the virtual page buffer.

11. The semiconductor device defined in claim 10, wherein the mask buffer is responsive to receipt of the address signal and the write signal to cause the logic state of the data elements of the mask buffer corresponding to the particular data elements of the virtual page buffer to be set to the second logic state.

12. The semiconductor device defined in claim 1, wherein individual ones of the selected ones of the data elements of the virtual page buffer are identifiable by respective addresses carried by a set of address lines.

13. The semiconductor device defined in claim 12, wherein the data elements of the virtual page buffer are arranged into a set of planes and the data elements of the mask buffer are arranged into a corresponding set of planes, wherein when the address lines identify a particular one of the selected ones of the data elements of the virtual page buffer, at least one of the address lines identifies the plane to which belongs the particular one of the selected ones of the data elements of the virtual page buffer.

14. The semiconductor device defined in claim 1, wherein the virtual page buffer and the mask buffer occupy respective portions of a common integrated memory structure.

15. The semiconductor device defined in claim 14, wherein the common integrated memory structure comprises static random access memory (SRAM) created using an SRAM compiler.

16. The semiconductor device defined in claim 1, wherein the input data is received from a memory controller.

17. The semiconductor device defined in claim 1, wherein the data elements of the virtual page buffer each include a first number of bits and wherein the data elements of the mask buffer each include a second number of bits, wherein the first number of bits is the same as the second number of bits.

18. The semiconductor device defined in claim 1, wherein the data elements of the virtual page buffer each include a first number of bits and wherein the data elements of the mask buffer each include a second number of bits, wherein the first number of bits is different from the second number of bits.

19. The semiconductor device defined in claim 18, wherein the first number of bits is greater than the second number of bits.

20. The semiconductor device defined in claim 1, wherein data read from each of the data elements of the virtual page buffer is represented by a plurality of bits, wherein the mask logic circuitry comprises a combiner for carrying out the combining, wherein the combiner includes a bank of two-input logic OR modules, each of the two-input logic OR modules being supplied with (i) the logic state of the corresponding one of the data elements of the mask buffer and (ii) a respective one of said bits.

21. A memory system, comprising:
a semiconductor device; and
at least one non-volatile memory device;
wherein the semiconductor device comprises:
a virtual page buffer including a plurality of data elements;
a mask buffer including a plurality of data elements, each of the data elements of the mask buffer corresponding to a respective one of the data elements of the virtual page buffer;
control logic circuitry for (i) setting each of the data elements of the mask buffer to a first logic state upon receipt of a trigger; (ii) causing input data to be written to selected ones of the data elements of the virtual page buffer; and (iii) causing those data elements of the mask buffer corresponding to the selected ones of the data elements of the virtual page buffer to be set to a second logic state different from the first logic state;
mask logic circuitry configured to provide masked output data by combining, for each of the data elements of the virtual page buffer, data read therefrom together with the logic state of the corresponding one of the data elements of the mask buffer; and
an output interface configured to release the masked output data towards the at least one non-volatile memory device.

22. The memory system defined in claim 21, wherein the non-volatile memory device comprises:
a page buffer, the page buffer including a plurality of data elements, each of the data elements of the page buffer corresponding to a respective one of the data elements of the virtual page buffer;
control logic circuitry for causing the masked output data received from the semiconductor device to be written sequentially to the data elements of the page buffer.

23. The memory system defined in claim 22, wherein the non-volatile memory device further comprises a memory core arranged into pages of data elements.

24. The memory system defined in claim 21, wherein the input data is received from a memory controller and is accompanied by address information specifying a group of data elements within the designated page of the memory core, memory system defined in claim previous, wherein the group of data elements leaves at least one intra-group gap of data elements not to be written to.

25. The memory system defined in claim 21, wherein the first logic state is a program inhibit state.

26. The memory system defined in claim 21, wherein the first logic state is a logic 1 state and wherein the second logic state is a logic 0 state.

27. A method for transferring input data to a non-volatile memory device, comprising:
maintaining a virtual page buffer including a plurality of data elements;
maintaining a mask buffer including a plurality of data elements, each of the data elements of the mask buffer corresponding to a respective one of the data elements of the virtual page buffer;
setting each of the data elements of the mask buffer to a first logic state upon receipt of a trigger;

writing data to selected ones of the data elements of the virtual page buffer and setting those data elements of the mask buffer corresponding to the selected ones of the data elements of the virtual page buffer to a second logic state different from the first logic state;

providing masked output data by combining, for each of the data elements of the virtual page buffer, data read therefrom together with the logic state of the corresponding one of the data elements of the mask buffer; and releasing the masked output data towards the non-volatile memory device.

28. The method defined in claim 27, said method is implemented by a semiconductor device, the method further comprising providing the trigger when power is established or re-established to the semiconductor device.

29. The method defined in claim 27, wherein said providing the trigger is performed in response to said releasing the masked output data towards the non-volatile memory device.

30. The method defined in claim 27, wherein the data elements of the virtual page buffer each include a first number of bits and wherein the data elements of the mask buffer each include a second number of bits, wherein the first number of bits is the same as the second number of bits.

31. The method defined in claim 27, wherein the data elements of the virtual page buffer each include a first number of bits and wherein the data elements of the mask buffer each include a second number of bits, wherein the first number of bits is different from the second number of bits.

32. The method defined in claim 31, wherein the first number of bits is greater than the second number of bits.

33. A computer-readable storage medium storing instructions which, when processed, are used to provide a semiconductor device configured to:

maintain a virtual page buffer including a plurality of data elements;

maintain a mask buffer including a plurality of data elements, each of the data elements of the mask buffer corresponding to a respective one of the data elements of the virtual page buffer;

set each of the data elements of the mask buffer to a first logic state upon receipt of a trigger;

write data to selected ones of the data elements of the virtual page buffer and setting those data elements of the mask buffer corresponding to the selected ones of the data elements of the virtual page buffer to a second logic state different from the first logic state;

provide masked output data by combining, for each of the data elements of the virtual page buffer, data read therefrom together with the logic state of the corresponding one of the data elements of the mask buffer; and release the masked output data towards the non-volatile memory device.

* * * * *